US007343428B2

(12) United States Patent
Fletcher et al.

(10) Patent No.: US 7,343,428 B2
(45) Date of Patent: *Mar. 11, 2008

(54) DYNAMIC, REAL-TIME INTEGRATION OF SOFTWARE RESOURCES THROUGH SERVICES OF A CONTENT FRAMEWORK

(75) Inventors: James C. Fletcher, Apex, NC (US); David B. Lindquist, Raleigh, NC (US); Michael C. Wanderski, Durham, NC (US); Ajamu A. Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1104 days.

This patent is subject to a terminal disclaimer.

(21) Appl. No.: 09/956,276

(22) Filed: Sep. 19, 2001

(65) Prior Publication Data

US 2003/0055624 A1     Mar. 20, 2003

(51) Int. Cl.
*G06F 15/16* (2006.01)
(52) U.S. Cl. .................. 709/250; 719/328; 719/331
(58) Field of Classification Search ............... 719/320, 719/328, 315, 310, 311, 331; 709/250, 217, 709/220, 201–203; 707/103 R
See application file for complete search history.

(56) References Cited

U.S. PATENT DOCUMENTS

| | | | |
|---|---|---|---|
| 5,715,453 A | 2/1998 | Stewart | |
| 5,884,317 A | 3/1999 | Cline et al. | |
| 6,189,138 B1 | 2/2001 | Fowlow et al. | |
| 6,327,628 B1 | 12/2001 | Anuff et al. | |
| 6,516,349 B1 | 2/2003 | Lieberman | |
| 6,560,633 B1 | 5/2003 | Roberts et al. | |
| 6,564,251 B2 | 5/2003 | Katariya et al. | |
| 6,643,650 B1 | 11/2003 | Slaughter et al. | |

(Continued)

FOREIGN PATENT DOCUMENTS

EP     0077653     11/2001

(Continued)

OTHER PUBLICATIONS

Argawal et al., Vinci: a service-oriented architecture for rapid development of web applications International World Wide Web Conference pp. 355-365 Year of Publication: 2001.*

(Continued)

*Primary Examiner*—Van H. Nguyen
(74) *Attorney, Agent, or Firm*—Marcia L. Doubet; Jeanine S. Ray-Yarletts; Joseph E. Bracken

(57) ABSTRACT

Methods, systems, and computer program products are disclosed for dynamically integrating software resources (such as web services and other back-end software resources) using the services of a content framework (such as a portal platform). A portlet model is leveraged to allow programmatic portlets to serve as proxies for web services, thereby extending portlets beyond their traditional visual role. A deployment interface and a system interface are described for these portlet proxies. The deployment interface is used for composing new web services, and a composition tool is described. The system interface allows for run-time management of the web services by the portal platform. The service provider for a particular function may be bound to the portlet proxy at development time or at run-time.

19 Claims, 19 Drawing Sheets

U.S. PATENT DOCUMENTS

| | | | |
|---|---|---|---|
| 6,681,221 B1 | 1/2004 | Jacobs | |
| 6,738,964 B1 | 5/2004 | Zink et al. | |
| 6,792,605 B1 | 9/2004 | Roberts et al. | |
| 6,829,630 B1 | 12/2004 | Pajak et al. | |
| 6,839,680 B1 | 1/2005 | Liu et al. | |
| 6,851,088 B1 | 2/2005 | Conner et al. | |
| 6,857,008 B1 | 2/2005 | Shenefiel | |
| 6,920,461 B2* | 7/2005 | Hejlsberg et al. | 707/103 R |
| 7,013,469 B2* | 3/2006 | Smith et al. | 719/328 |
| 7,017,162 B2* | 3/2006 | Smith et al. | 719/328 |
| 2001/0007976 A1 | 7/2001 | Thompson et al. | |
| 2001/0034771 A1* | 10/2001 | Hutsch et al. | 709/217 |
| 2002/0046301 A1* | 4/2002 | Shannon et al. | 709/328 |
| 2002/0059526 A1 | 5/2002 | Dillon et al. | |
| 2002/0065946 A1* | 5/2002 | Narayan | 719/315 |
| 2002/0067370 A1* | 6/2002 | Forney et al. | 345/742 |
| 2002/0111848 A1 | 8/2002 | White | |
| 2002/0142760 A1 | 10/2002 | Gidron et al. | |
| 2002/0158899 A1* | 10/2002 | Raymond | 345/736 |
| 2002/0174178 A1* | 11/2002 | Stawikowski | 709/203 |
| 2002/0184070 A1 | 12/2002 | Chen et al. | |
| 2002/0198973 A1* | 12/2002 | Besaw | 709/223 |
| 2003/0005090 A1* | 1/2003 | Sullivan et al. | 709/220 |

FOREIGN PATENT DOCUMENTS

| | | |
|---|---|---|
| EP | 0186486 | 11/2001 |
| WO | 99/50756 A1 | 10/1999 |

OTHER PUBLICATIONS

Zirpins et al., Advanced concepts for next generation portals Database and Expert Systems Applications 2001 pp. 501-506.*
http://www-4.ibm.com/software/solutions/webservices/pdf/WPS. pdf ("WebSphere Portal Server . . . " paper by Thomas Schaeck).
http://www.groupcomputing.com/dpmain.nsf/NewsNotes/446648D41A2EB48187256A2B00694388?OpenDocument ("IBM Introduces Portal . . . ").
http://www-4.ibm.com/software/webservers/portal/architect.html ("WebSphere Portal Server", printed in landscape).
http://www.computerworld.com/cwi/Printer_Friendly_Version/0,1212,NAV47_STO60 734-,00.html ("Rival Vendors Update . . . ").
http://www.nwfusion.com/news/2001/0517broadvision.html ("BroadVisions jumps . . . ").
http://www.nwfusion.com/archive/2001/120330_05-07-2001.html ("Bowstreet jumps . . . ").
http://www.nwfusion.com/archive/2001/120394_05-07-2001.html ("New portal aims . . . ").
http://www.nwfusion.com/archive/2001/121225_05-28-2001.html ("BEA next up . . . ").
http://www.nwfusion.com/news/2001/0613plattner.html ("Plattner says . . . ").
http://www.nwfusion.com/news/2001/0705epicentric.html ("Epicentric's portals . . . "), dated Jul. 5.
http://www.nwfusion.com/news/2001/0709apps.html ("Epicentric's portals . . . "), dated Jul. 9.
http://www.nwfusion.com/news/2001/0717atgportals.html ("ATG unveils . . . ").
http://searchdomino.techtarget.com/originalContent/0,289142,sid4_gci759481_dis4,00.html ("Domino News" page, titled "For Documentum . . . ").
http://www-4.ibm.com/software/webservers/appserv/ ("WebSphere Application Server").
http://www-4.ibm.com/software/webservers/portal/ ("WebSphere Portal Server").
http://searchmiddleware.techtarget.com/newsItem/0,289139,sid26_gci553913,00. html ("Middleware News" page, titled "Rival vendors . . . ").
http://www.xmethods.net/ ("XMethods", printed in landscape).
http://www.nwfusion.com/news/2001/0515bvision.html ("BroadVision updates . . . ").
http://www-106.ibm.com/developerworks/webservices/library/ws-peer4/ ("The Web services (r)evolution: Part 4 . . . ").
http://www-4.ibm.com/software/solutions/webservices/pdf/WSFL. pdf ("Web Services Flow Language . . . ").
http://www-4.ibm.com/software/solutions/webservices/pdf/WSCA. pdf ("Web Services Conceptual . . . ").
Czerwinski, S. E., et al, "An Architecture for a Secure Service Discovery Service", Mobicom '99. Proceedings of the 5th annual ACM/IEEE International Conference on Mobile Computing and Networking. Seattle, WA. Aug. 15-20, 1999. pp. 24-35, XP000896069.
Lai, C., et al, "User Authentication and Authorization in the Javaplatform", Computer Security Applications Conference, 1999. Proceedings. 15th annual Phoenix, Az, USA Dec. 6-10, 1999. Los Alamitos, CA, USA, IEEE Comput. Soc. pp. 285-290, XP010368605.
D. Ferguson: "Technical and Product Architecture and Roadmap" IBM Web Services, Online, May 2001, pp. 1-42, XP002272181. Retrieved from Internet: URL: www-306.ibm.com/software/solutions/webservices/pdf/roadmap.pdf retrieved on Mar. 2, 2004. The whole document.
Caswell et al. "Using service models for management of internet services", Hewlett Packard publication available at www.hpl.hp.com/techreports'. published Mar. 1999.
Gaedke et al. "Supporting compositional reuse in component-based web engineering", Symposium on Applied Computing 2000, Mar. 2000, pp. 927-933.
Irani, Romin. "An Introduction to ebXML: Collaborative Electronic Business is here to stay". Jul. 11, 2001. Online article from Web Services Architect (webservicesarchitect.co.
Schaeck, Thomas. "WebSphere Portal Server and Web Services Whitepaper", May 2001, pp. 1-23.
Sanders, Rita-Lyn. "IBM Introduces Portal Technology with Benefits for K-station", Apr. 11, 2001 (4 pages).
"WebSphere Portal Server", printed Sep. 10, 2001 (2 pages).
Gladwin, Lee Copeland, "Rival Vendora Update Their Portal Software", May 21, 2001 (2 pages).
Mears, Jennifer. "BroadVision jumps into portal game", May 7, 2001 (2 pages).
Mears, Jennifer, "Bowstreet jumps into portable" May 7, 2001, (2 pages).
Mears, Jennifer. "New portal aims to make searching easy", May 7, 2001 (2 pages).
Ohlson, Kathleen, "BEA next up to outline Web services strategy", NetworkWorldFusion, May 28, 2001, 2 pages.
Cowfey, Stacy, "Plattner says portals are SAP's focus", Jun. 13, 2001 (2 pages).
Mears, Jennifer, "Epicentric's portal targets 'Intelligent' Web services" Dated Jul. 5, 2001, (2 pages).
Mears, Jennifer. "Epicentric's portal targets 'intelligent' Web services" Dated Jul. 9, 2001, (2 pages).
Mears, Jennifer. "ATG unveils quick way to build portals", Jul. 11, 2001 (2 pages).
Pellance, Nick. Domino News. "For Documentation, Web services start with portals", Jun. 8, 2001 (2 pages).
"WebSphere Application Server" IBM, printed Sep. 10, 2001 (2 pages).
"WebSphere Portal Server" IBM, printed Sep. 10, 2001 (2 pages).
Middleware News. "Rival vendors update their portal software" May 21, 2001, (2 page).
"X Methods" Printed Sep. 4, 2001 (6 pages).
Cowley, Stacy, "BroadVision updates enterprise portal product", May 15, 2001 (1 page).
Glass, Graham. "The Web services (r)evolution: Part 4", Feb. 2001 (14 pages).
Leymann, Frank, IBM Software Group, "Web Services Flow Language (WSFL 1.0)" May 2001. (108 pages).
Kreger, Heather. IBM Software Group. "Web Services Conceptual Architecture (WSCA 1.0)" May 2001. (40 pages).

* cited by examiner

410
```xml
<?xml version="1.0"?>
<definitions
    name="Deployment"
    targetNamespace="http://portal-definitions/Deployment.wsdl"
    xmlns:tns="http://portal-definitions/Deployment.wsdl"
    xmlns:wsfl="http://schemas.xmlsoap.org/wsfl/"
    xmlns="http://schemas.xmlsoap.org/wsdl/">
```

420
```xml
<message name="getDisplayNameInput">
    <part name="displayNameInput" element="xsd:nil"/>
</message>
<message name="getDisplayNameOutput">
    <part name="displayNameOutput" element="xsd:string"/>
</message>
<message name="getDisplayIcon16x16Input">
    <part name="displayIcon16x16Input" element="xsd:nil"/>
</message>
<message name="getDisplayIcon16x16Output">
    <part name="displayIcon16x16Output" element="xsd:image"/>
</message>
...
```

430
```xml
<portType name="DeploymentPortType">
    <operation name="getDisplayName">
        <input message="tns:getDisplayNameInput"/>
        <output message="tns:getDisplayNameOutput"/>
    </operation>
    <operation name="getDisplayIcon16x16">
        <input message="tns:getDisplayIcon16x16Input"/>
        <output message="tns:getDisplayIcon16x16Output"/>
    </operation>
    ...
</portType>
</definitions>
```

460 
```
<?xml version="1.0"?>
<definitions
    name="System"
    targetNamespace="http://portal-definitions/System.wsdl"
    xmlns:tns="http://portal-definitions/System.wsdl"
    xmlns:wsfl="http://schemas.xmlsoap.org/wsfl/"
    xmlns="http://schemas.xmlsoap.org/wsdl/">
```

470
```
<types>
    <schema xmlns="http://www.w3.org/2000/10/XMLSchema">
        <element name="Event">
            <complexType>
                <all>
                    <element name="uuid" type="xsd:string/>
                    <element name="type" type="xsd:string/>
                    <element name="when" type="xsd:date/>
                </all>
            </complexType>
        </element>
    </schema>
</types>
...
```

FIG. 4B2

```
480  <message name="logEventReceive">
         <part name="logEventInput" element="tns:Event"/>
     </message>
     <message name="reportInput">
         <part name="reportUsageResource" element="xsd:string"/>
         <part name="reportUsageQuantity" element="xsd:integer"/>
     </message>
     <message name="reportOutput">
         <part name="reportReturnCode" element="xsd:string"/>
     </message>
     ...
490  <portType name="SystemPortType">
         <operation name="logEvent">
             <input message="tns:logEventReceive"/>
         </operation>
         <operation name="reportUsage">
             <input message="tns:reportInput"/>
             <output message="tns:reportOutput"/>
         <operation/>
     ...
     </portType>
     ...
     </definitions>
```

FIG. 8
800
810 Service Flow
820 Service Discovery
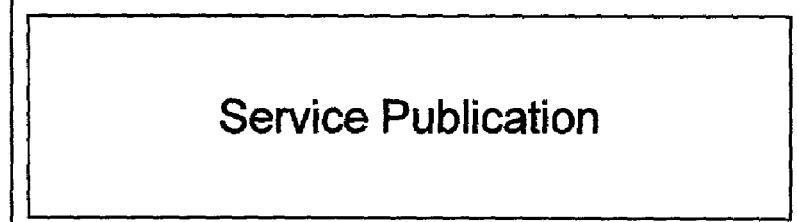
830 Service Publication
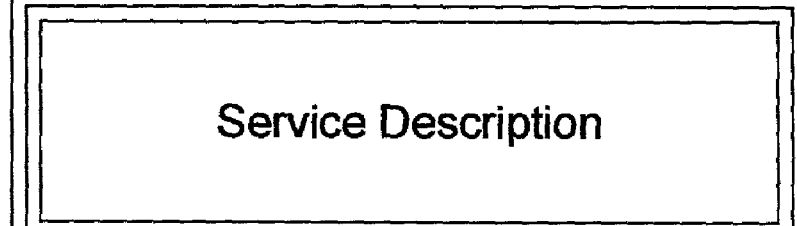
840 Service Description
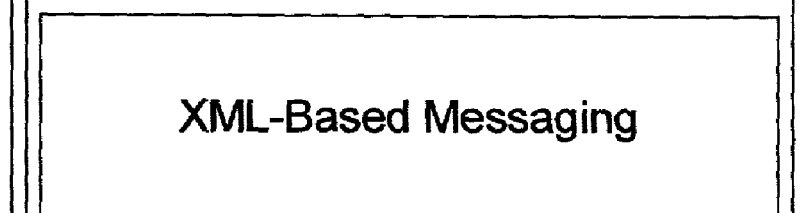
850 XML-Based Messaging
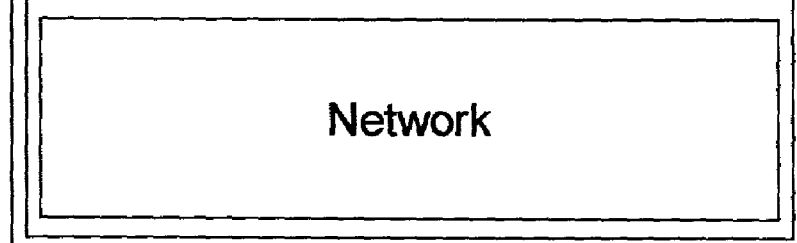
860 Network

FIG. 11A

```
public integer processCreditTransaction
        (Integer cardNumber, float purchaseAmount, date expirationDate)
```

FIG. 11B

```
public Boolean acceptCreditCard
        (String accountNumber, string cardHolderName,
        float currentAmount, float outstandingBalance, date expirationDate)
```

FIG. 11C

```
public Boolean creditCardService
        (String accountNumber, integer cardNumber,
        string cardHolderName, float amount, float outstandingBalance,
        date expirationDate)
```

1410
```
<plugLink>
    <source serviceProvider="serviceSend"
            portType="sendPortType"
            operation="send"/>
    <target serviceProvider="serviceReceive"
            portType="receivePortType"
            operation="receive"/>
    <map sourceMessage="sendForm"
         targetMessage="receiveForm"/>
    <locator type="static"
             service="TheServiceReceiver.com"/>
</plugLink>
```

```
<result>
    <firstName>Mike</firstName>
    <lastName>Wanderski</lastName>
</result>
```

```
<map sourceMessage="theSourceMessage"
     targetMessage="submitNameMessage"
     sourcePart="firstName"
     targetPart="name"/>
```

FIG. 15C

```
<map sourceMessage="wsSourceMessage"
     targetMessage="submitNameMessage"
     converter="urn:thePortalURN"/>
```

| From | To | Convert-let |
|---|---|---|
| portlet-A | portlet-B | A-to-B |
| portlet-A | portlet-C | A-to-C |
| portlet-B | portlet-Z | B-to-Z |
| ... | ... | ... |

DYNAMIC, REAL-TIME INTEGRATION OF SOFTWARE RESOURCES THROUGH SERVICES OF A CONTENT FRAMEWORK

RELATED INVENTIONS

The present invention is related to U. S. Pat. 6,985,939 (Ser. No. 09/955,788), which is titled "Building Distributed Software Services as Aggregations of Other Services", and U.S. Pat. No. 7,035,944 (Ser. No. 09/956,268), which is titled "Programmatic Management of Software Resources in a Content Framework Environment", both are which are commonly assigned to International Business Machines Corporation and which were filed concurrently herewith.

BACKGROUND OF THE INVENTION

1. Field of the Invention

The present invention relates to computer software, and deals more particularly with techniques for dynamic, real-time integration of software resources (such as web services, JavaBeans™, and other types of software resources) using the services of a content framework (such as a portal) in a distributed computing environment.

2. Description of the Related Art

The popularity of distributed computing networks and network computing has increased tremendously in recent years, due in large part to growing business and consumer use of the public Internet and the subset thereof known as the "World Wide Web" (or simply "Web"). Other types of distributed computing networks, such as corporate intranets and extranets, are also increasingly popular. As solutions providers focus on delivering improved Web-based computing, many of the solutions which are developed are adaptable to other distributed computing environments. Thus, references herein to the Internet and Web are for purposes of illustration and not of limitation.

The early Internet served primarily as a distributed file system in which users could request delivery of already-generated static documents. In recent years, the trend has been to add more and more dynamic and personalized aspects into the content that is served to requesters. One area where this trend is evident is in the increasing popularity of content frameworks such as those commonly referred to as "portals" (or, equivalently, portal platforms, portal systems, or portal servers). A portal is a type of content framework which is designed to serve as a gateway, or focal point, for end users to access an aggregation or collection of information and applications from many different sources. Portals are typically visual in nature, and provide their users with a Web page known as a "portal page". A portal page is often structured as a single overview-style page (which may provide links for the user to navigate to more detailed information). Alternatively, portal pages may be designed using a notebook paradigm whereby multiple pages are available to the user upon selecting a tab for that page. Some experts predict that portal pages will become the computing "desktop" view of the future.

Another area where advances are being made regarding dynamic content is in the so-called "web services" initiative. This initiative is also commonly referred to as the "service-oriented architecture" for distributed computing. Web services are a rapidly emerging technology for distributed application integration in the Internet. In general, a "web service" is an interface that describes a collection of network-accessible operations. Web services fulfill a specific task or a set of tasks. They may work with one or more other web services in an interoperable manner to carry out their part of a complex workflow or a business transaction. For example, completing a complex purchase order transaction may require automated interaction between an order placement service (i.e. order placement software) at the ordering business and an order fulfillment service at one or more of its business partners.

Many industry experts consider the service-oriented web services initiative to be the next evolutionary phase of the Internet. With web services, distributed network access to software will become widely available for program-to-program operation, without requiring intervention from humans.

Web services are generally structured using a model in which an enterprise providing network-accessible services publishes the services to a network-accessible registry, and other enterprises needing services are able to query the registry to learn of the services' availability. The participants in this computing model are commonly referred to as (1) service providers, (2) service requesters, and (3) service brokers. These participants, and the fundamental operations involved with exchanging messages between them, are illustrated in FIG. 1. The service providers 100 are the entities having services available, and the registry to which these services are published 110 is maintained by a service broker 120. The service requesters 150 are the entities needing services and querying 140 the service broker's registry. When a desired service is found using the registry, the service requester binds 130 to the located service provider in order to use the service. These operations are designed to occur programmatically, without human intervention, such that a service requester can search for a particular service and make use of that service dynamically, at run-time. The web services model is theoretically available for any type of computing application. However, the web services which are accessible from registries today are limited to relatively simple programs such as "Hello, World!" demo programs, programs which look up the current temperature for a particular zip code, programs which perform currency exchange calculations, and so forth.

The core set of standards on which web services work is being built includes HTTP ("Hypertext Transfer Protocol"), SOAP ("Simple Object Access Protocol") and/or XML ("Extensible Markup Language") Protocol, WSDL ("Web Services Description Language"), and UDDI ("Universal Description, Discovery, and Integration"). HTTP is commonly used to exchange messages over TCP/IP ("Transmission Control Protocol/Internet Protocol") networks such as the Internet. SOAP is an XML-based protocol used to send messages for invoking methods in a distributed environment. XML Protocol is an evolving specification of the World Wide Web Consortium ("W3C") for an application-layer transfer protocol that will enable application-to-application messaging, and may converge with SOAP. WSDL is an XML format for describing distributed network services. UDDI is an XML-based registry technique with which businesses may list their services and with which service requesters may find businesses providing particular services. (For more information on SOAP, refer to "Simple Object Access Protocol (SOAP) 1.1, W3C Note 08 May 2000", which is available on the Internet at the W3C Web site. More information on XML Protocol and the creation of an XML Protocol standard is also available at the W3C Web site. The WSDL specification is titled "Web Services Description Language (WSDL) 1.1, W3C Note 15 March 2001", and may be found on the Internet at the W3C Web site. For more information on UDDI, refer to the UDDI specification which is entitled "UDDI Version 2.0 API Specification, UDDI Open Draft Specification 8 June 2001", and which can be found on the Internet at the Web site of the Organization for the Advancement of Structured Information Standards ("OASIS"). HTTP is described in Request For Comments ("RFC") 2616 from the Internet Engineering Task Force, titled "Hypertext Transfer Protocol—HTTP 1.1" (June 1999).)

Application integration using these open standards requires several steps. The interface to a web service must be described, including the method name(s) with which the service is invoked, the input and output parameters and their data types, and so forth. WSDL documents provide this information, and are transmitted using a UDDI publish operation to a registry implemented according to the UDDI specification. Once the service is registered in the UDDI registry, service requesters can issue UDDI find requests to locate distributed services. A service requester locating a service in this manner then issues a UDDI bind request, which dynamically binds the requester to the located service using the service information from the WSDL document. (These UDDI operations have been illustrated, at a high level, in FIG. 1.) SOAP/XML Protocol and HTTP messages are commonly used for transmitting the WSDL documents and the UDDI requests. (Hereinafter, references to SOAP should be construed as referring equivalently to semantically similar aspects of XML Protocol. Furthermore, it should be noted that references herein to "HTTP" are intended in a generic sense to refer to HTTP-like functions. Some UDDI operations, for example, require HTTPS instead of HTTP, where HTTPS is a security-enhanced version of HTTP. These differences are not pertinent to the present invention, however, and thus no distinction is made hereinafter when discussing HTTP.)

The goal of web services is to provide service requesters with transparent access to program components which may reside in one or more remote locations, even though those components might run on different operating systems and be written in different programming languages than those of the requester. While a significant amount of work has been done to define the goals, architecture, and standards on which web services will be based, much work remains to be done to make web services operate effectively and efficiently.

SUMMARY OF THE INVENTION

An object of the present invention is to provide a technique for dynamically integrating software resources (including, but not limited to, web services) in a distributed network.

Another object of the present invention is to provide a technique for leveraging a portal model and framework for real-time integration of software resources as web services.

A further object of the present invention is to define techniques for making software resources available for web services using a portlet model.

Yet another object of the present invention is to define techniques for using portlets as web service intermediaries.

Another object of the present invention is to provide a technique for enabling programmatic management of software resources used in web services.

A further object of the present invention is to provide a composition model for building web services as aggregations of other services and/or software resources.

Still another object of the present invention is to provide a composition utility which enables fast and efficient construction of web services from other services and/or software resources.

A further object of the present invention is to leverage a dual aggregation model for web services.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for real-time integration of software resources in a computing network. In preferred embodiments, this technique comprises: using a portlet interface of a portlet to represent a collection of one or more software resources; and using a portal platform to integrate the collection of software resources with other collections at run-time to carry out a software service.

Using a portlet interface preferably further comprises: defining a public interface of the portlet as an interface to the collection; specifying the public interface in a service description document; and registering the service description document in a registry. Using the portlet interface may also further comprise defining a deployment interface fir the portlet and specifying the deployment interface in the service description document. In addition or instead, using the portlet interface may further comprise defining a system interface for the portlet and specifying the system interface in the service description document.

The technique may further comprise implementing deployment operations in the software resources of the collection, wherein the deployment operations implement the deployment interface, and/or implementing management operations in the software resources of the collection, wherein the management operations implement the system interface.

The collection is represented as a portlet in preferred embodiments, and the software resources may comprise other portlets as well as non-portlets (including web services, JavaBeans,™ and Enterprise JavaBeans™). The collection of software resources may comprise a web service.

The present invention will now be described with reference to the following drawings, in which like reference numbers denote the same element throughout.

BRIEF DESCRIPTION OF THE DRAWINGS

FIGS. 4A and 4B illustrate the content of sample WSDL documents specifying a deployment interface and a system interface, respectively, according to preferred embodiments of the present invention;

FIG. 8 illustrates a web services stack which may be used in a networking environment in which the present invention operates;

FIGS. 11A-11C are used to illustrate signatures of methods, and the need to provide a signature superset when dynamic run-time binding is to be used;

FIG. 14 illustrates a sample "plug link" specification which is representative of those used according to the present invention;

FIGS. 15A-15C provide syntax used to describe mapping of data between operations;

FIG. 16 is a simple example of information that may be contained in a transformation registry.

DESCRIPTION OF PREFERRED EMBODIMENTS

Figure 1:
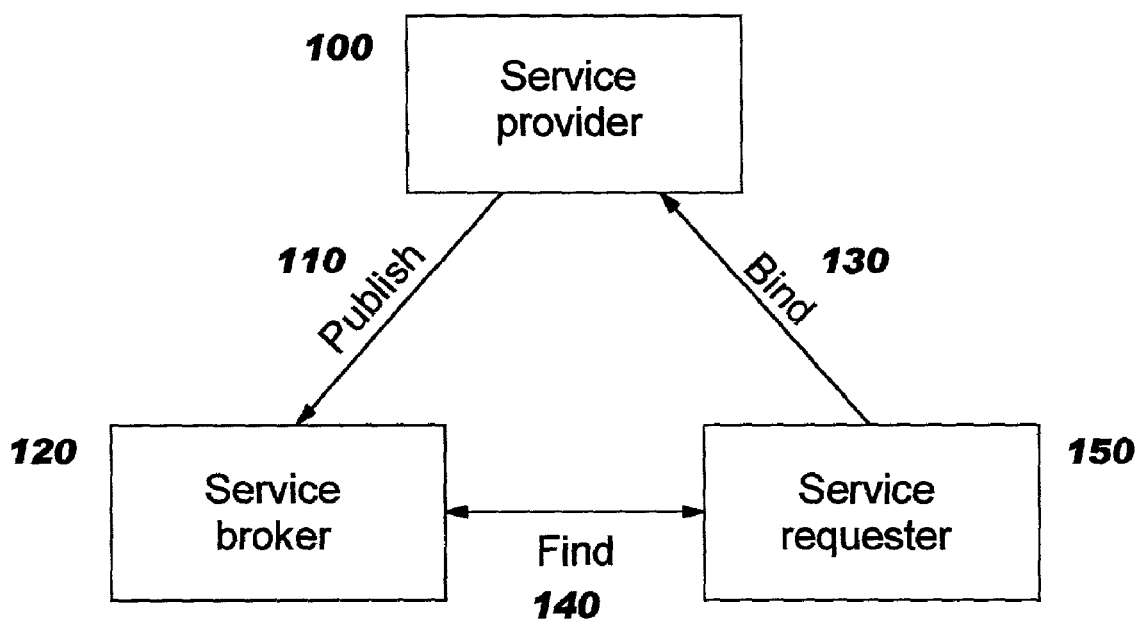
FIG. 1 provides a diagram illustrating the participants and fundamental operations of a service-oriented architecture, according to the prior art.

The promise of web services is that disparate applications will be able to interoperate like never before, offering a new breed of seamless hyper-integrated applications through openness and urbanization of enterprise systems. Web services will make distributed software resources more widely available, and will allow software to be marketed as a service. As web services become widespread, there will be a need for managing the services and for an aggregation point where these services can be aggregated to form new services which can then be deployed. A content framework such as a portal platform provides many built-in services for content management and service hosting, such as persistence, personalization, and transcoding. The present invention defines novel techniques for leveraging portal platforms, extending the platforms to provide for aggregation, deployment, and management of web services. Providing access to software services through portal aggregation will lower integration costs and help speed time-to-market. This type of portal usage for application-to-application communication may be referred to as an "application portal", in contrast to the "visual portals" which are designed to display information to human users. Companies providing application portals today promote low-cost Enterprise Application Integration ("EAI") and provide application access and management through a standard portal platform. However, existing EAI products do not yet programmatically integrate web services nor do they integrate web services in real-time, and these existing products require that small "engagements" are manually provided as the "glue" necessary to define a static binding to hook web services into a portal before applications can be deployed. (For example, an engagement may be needed to surface the interface to an enterprise's customer relationship management, or "CRM", software resources at the visual portal. The engagements often use proprietary software and/or custom-defined XML communications. This approach is therefore not suitable for dynamic, programmatic aggregation or integration on a global scale.) Current estimates are that creating such engagements requires anywhere from several days to several weeks. JamCracker, Onyx, and USInternetworking are among the companies providing EAI using application portals today. No systems are known to the inventors which enable real-time deployment of software resources by aggregating them in a modeling composition tool, and then programmatically integrating and managing them using open industry standards as disclosed herein.

The present invention defines techniques for integrating web services and other back-end software resources into an application portal platform using a portlet model or paradigm, thereby creating new web services. One commercially-available portal platform on which the present invention may be implemented is the WebSphere® Portal Server ("WPS") from the International Business Machines Corporation ("IBM"). ("WebSphere" is a registered trademark of IBM.) Note, however, that while discussions herein are in terms of a portal platform, the inventive concepts are applicable to other types of content frameworks which provide analogous functionality and are also applicable to portals other than WPS, and thus references to portals and their portlet paradigm is by way of illustration and not of limitation. Using the disclosed techniques, an application portal functions not only as an access point for statically integrating services after manually providing engagements, as in the prior art, but also functions as a full web service utility. In its capacity as a web service utility, a portal platform according to the present invention provides programmatic management of web services and dynamic run-time integration of web services.

One aspect of the present invention also provides a tool for composition or aggregation of new web services. Using this composition tool, a systems administrator (or, equivalently, a service composer or other person) may define a new service composed of more fine-grained services. According to preferred embodiments of this aspect, the fine-grained services from which other services are built may reside locally or remotely, and the techniques disclosed herein enable referencing those services and using those services in a transparent manner without regard to whether they are local or remote. The fine-grained services may include any form of programming logic, including script programs, Java™ classes, COM classes, EJBs ("Enterprise JavaBeans"™), stored procedures, IMS or other database transactions, legacy applications, and so forth. ("Java" and "Enterprise JavaBeans" are trademarks of Sun Microsystems, Inc.) The web services created in this manner can then automatically be managed by the portal platform and can also be used in creating new web services in a recursive manner, as will be described.

Figure 2:
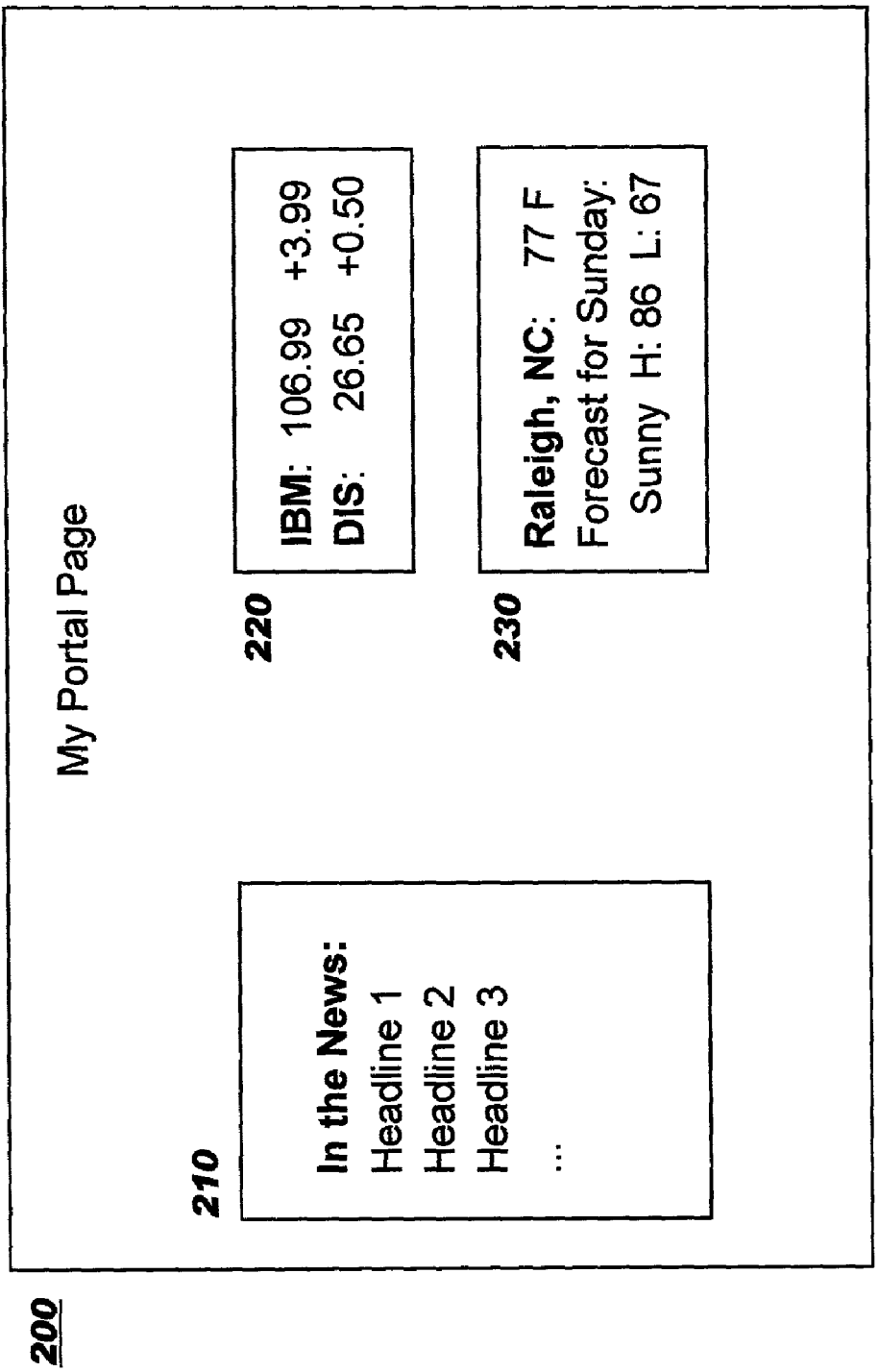
FIG. 2 illustrates a sample portal page in which content from visually-oriented portlets is rendered, according to the prior art.

The disclosed techniques build on the portal concept of a plug-in, which is referred to in the art as a "portlet". Portlets are known in the prior art which are visual in nature. In the visual portal model, each portlet is responsible for obtaining a portion of the content that is to be rendered as part of the complete portal page for the user. By convention, the portlet's "service" method is invoked to return markup language (such as Hypertext Markup Language, or "HTML") syntax encapsulating the result of the portlet's execution. Once the visual portlet's content has been aggregated with other markup language syntax by the portal page from which it was invoked, the result is a Web page whose content is well suited for the needs of the portal page's human user. FIG. 2 provides an example of a prior art portal page 200 from a visual portal, where this portal page includes content from three visually-oriented portlets (see elements 210, 220, 230). Portlet 210 in this example displays news headlines. Portlet 220 shows a stock ticker for the user's favorite stocks, and portlet 230 displays the current weather and weather forecast for the user's selected city.

In many content-rich visual portals, the output of visually-oriented portlets is aggregated physically on the portal page according to the portlets' content categorization or taxonomy. For example, output of news feed portlets may be provided on one tabbed page of a notebook-style visual portal, with output of weather portlets on another tabbed page and perhaps the output of portlets of interest to an enterprise's employees may be provided on another. Or, portlet output may be grouped within logical sections of a single portal page. The physical layout of the portal page may therefore enable end users to find information more quickly and efficiently. Work is ongoing to build remote interfaces to visually-oriented portlets such that visual portals can aggregate content from applications which may be located on machines other than the machine on which the portal code resides. This aggregated content will then be presented on the portal page, and whether it was obtained from a locally-available portlet or from a remote portlet will be transparent to the end user. (See, for example, "WebSphere Portal Server and Web Services Whitepaper", T. Schaeck, published by IBM on the Internet, which discusses remote interfaces to visually-oriented portlets.)

A portal platform provides a number of services for the portlets it hosts, as described above. The present invention leverages portlets as a portal interface, and also builds upon the concept of a remote portlet interface (where this concept is extended as disclosed herein to apply to programmatic portlets), to enable access to software resources. Portlets functioning according to the present invention are also referred to herein as "web service intermediaries" or "web service proxies", or simply as "intermediaries" or "proxies". That is, a portlet may now act as an intermediary between an application or software resource requesting a particular service and a software resource providing that service. According to the present invention, the software resource performing a particular function may be statically bound to a web service proxy (for example, at development time), or a web service proxy may be bound to a software resource which is dynamically selected (for example, based upon criteria which are evaluated at run-time). In either case, the portlet proxy receives request messages and forwards them to the software resource to which it is bound; once the software resource has completed the requested function, it returns its response to the portlet proxy which then forwards the response to the requester.

Figure 3:
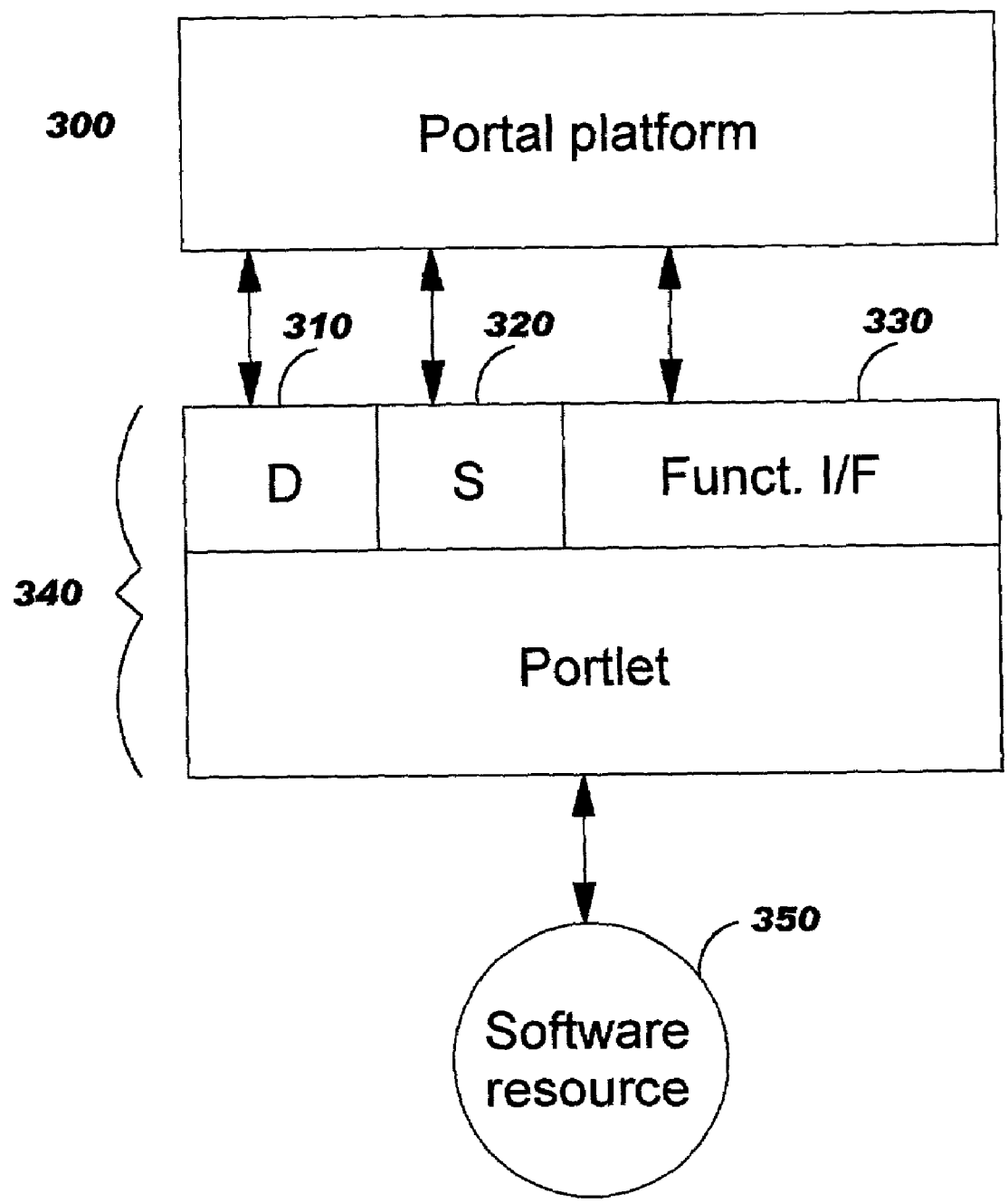
FIG. 3 is a block diagram illustrating a portlet structured as a web service proxy, according to preferred embodiments of the present invention.

A block diagram illustrating a portlet structured as a web service proxy is shown in FIG. 3. As shown therein, portlet proxy 340 includes a deployment interface 310, a system interface 320, and a functional interface 330. The portlet proxy communicates with a portal platform 300 using these interfaces, acting as an intermediary between the portal platform and the software resource 350 which carries out the function of interest. Details of each functional interface are specific to the web service provided by software resource 350, and do not form part of the present invention. The present invention, however, makes the functional interface of the software resources available as an interface 330 of the portlet proxy. (Exposing the functional interface using WSDL definitions and SOAP services may be accomplished using a commercially-available tool such as the IBM Web Services Toolkit, or "WSTK", during the deployment process.) The deployment interface and system interface will be described in more detail below.

The software resources invoked using the techniques of the present invention are typically designed for program-to-program interaction, but may alternatively be visual in nature. For example, visually-oriented resources may be invoked during execution of a web service which operates primarily in a program-to-program manner. The term "programmatic portlet" is used herein to refer generally to portlet proxies according to the present invention, whether or not the underlying software resource involves visually-oriented code.

A deployment interface and a system interface are defined for each portlet which serves as a web service proxy, according to preferred embodiments of the present invention. (In alternative embodiments, advantages of the present invention may be realized by implementing either the deployment interface or the system interface separately, and such implementations are within the scope of the present invention. For example, there may be cases in which it may be desirable not to implement management services for some web services. In such cases, the system interface may be omitted; alternatively, a system interface might be provided which has no operations or which has operations implemented as empty functions.) These new interfaces may also be referred to as the deployment port type and system port type, respectively. A portlet according to the present invention thus defines a service provider type that includes the port types necessary for portal integration of software resources and service interaction and management. ("Port types" is a term used in the art to signify the specification of a portlet's operations, and "service provider type" is a term used to signify a collection of port types.)

The deployment interface enables a portlet proxy (that is, an aggregated web service which is represented by a portlet proxy) to be used in subsequent web service composition operations, in a recursive manner. For example, the deployment interface of a portlet "A" provides information about portlet A for use as portlet A is aggregated with other portlets to form a new web service "Z"; by defining a deployment interface for web service Z, according to the present invention, information about web service Z can subsequently be provided as service Z is used for composing other new services.

The system interface is used for run-time management of portlets (that is, of web services represented by portlet proxies) by the portal platform. Use of the system interface allows the portal platform to perform functions such as logging of events, billing, and other types of administrative operations pertaining to execution of the web service. This requires 2-way communication between the portal platform and the portlet proxy, and uses novel techniques which are disclosed herein.

Referring now to the sample WSDL documents in FIGS. 4A and 4B (representing interface definitions), the deployment interface specification and system interface specification, respectively, are illustrated. According to preferred embodiments, the deployment and system port types are represented as WSDL documents for registration in a registry. As shown at 410 of the WSDL document 400 in FIG. 4A, the example deployment interface is named "Deployment" and includes operations such as "getDisplayName" and "getDisplayIcon16×16" (see element 430). These operations may be used, for example, to retrieve a descriptive name of the web service and to retrieve a graphic image representing the web service for placement on a palette of a web service composition tool (such as that illustrated in FIG. 5). According to the WSDL specification, the input and output messages used for communicating with a service are specified in "<message>" elements 420, where the parameters used by those messages are defined as "<part>" elements. Thus, a message element is defined for each message of each operation specified for this port type. (Refer to the WSDL specification for more information about the details of a WSDL document.)

The WSDL document 450 in FIG. 4B defines the system interface, which in the example is named "System" (see element 460). A complex data type named "Event" is defined (see element 470), comprising 2 string parameters and a date parameter. This data type may be used, for example, when exchanging logging data to be recorded in an auditing log file. A "logevent" operation is defined (see element 490), and in this example is a 1-way operation invoked using a "logEventReceive" message (see element 480) which has a parameter of type Event. In addition, the example defines a "reportUsage" operation which has 2 messages "reportInput" and "reportOutput".

Figure 5:
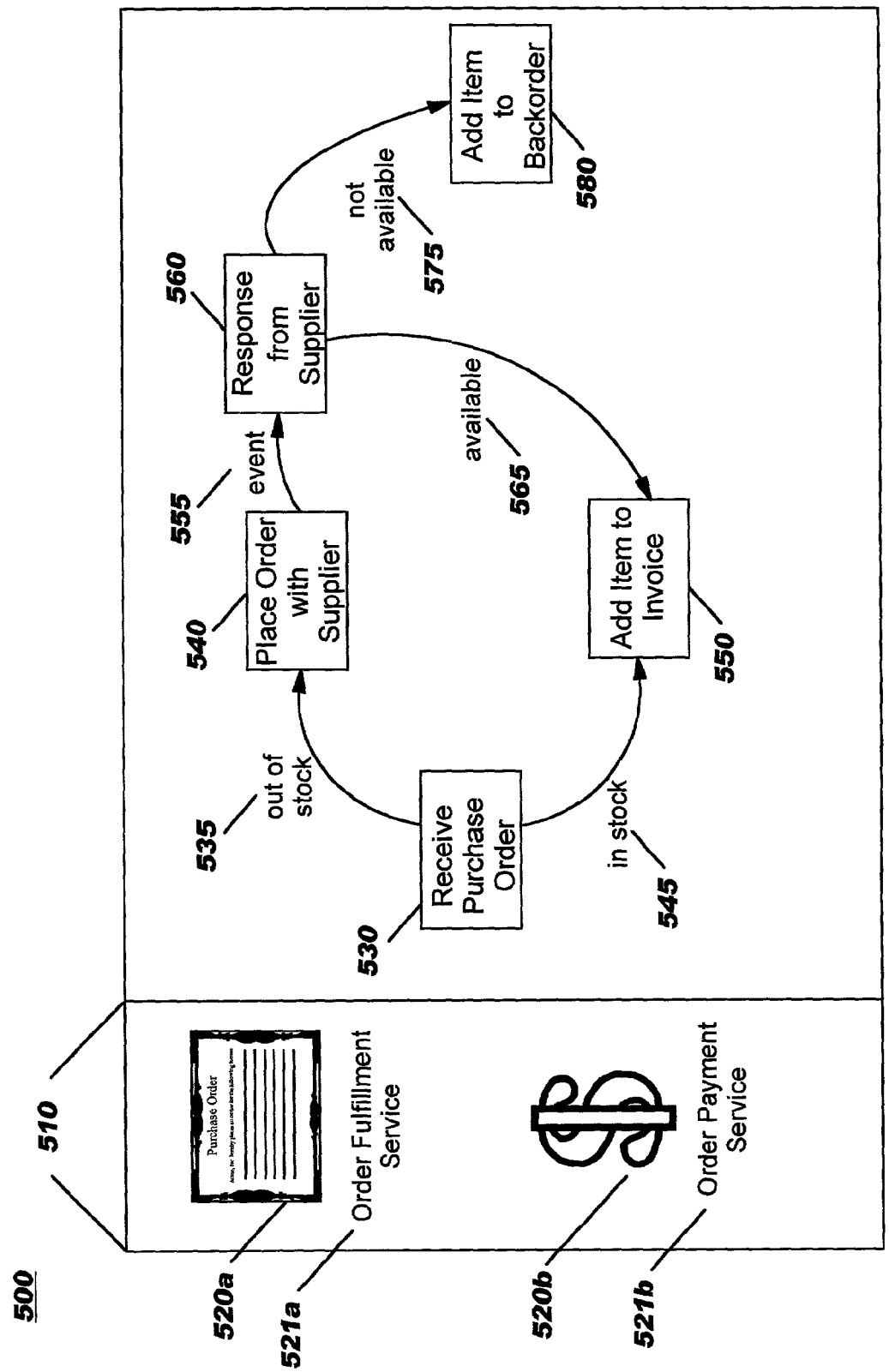
FIG. 5 illustrates a graphical web service composition tool of the type which may be created according to the teachings of the present invention.

The deployment port type is used at design time, and allows a new web service to be composed with a web service composition tool such as that illustrated by FIG. 5. The deployment port type contains operations pertinent to the modeling composition process. Representative examples of operations which may be useful for this purpose include "getIcon16×16" and "getIcon32×32" to retrieve icons (such as 520a, 520b) of different sizes for placement on a portlet palette (illustrated by element 510), "getDisplayName" and "getDisplayDescription" to provide textual information for presenting to a service composer (such as that illustrated at 521a and 521b), "getAuthorName" to retrieve an identification of the software developer or the service composer, and so forth.

Figure 6:
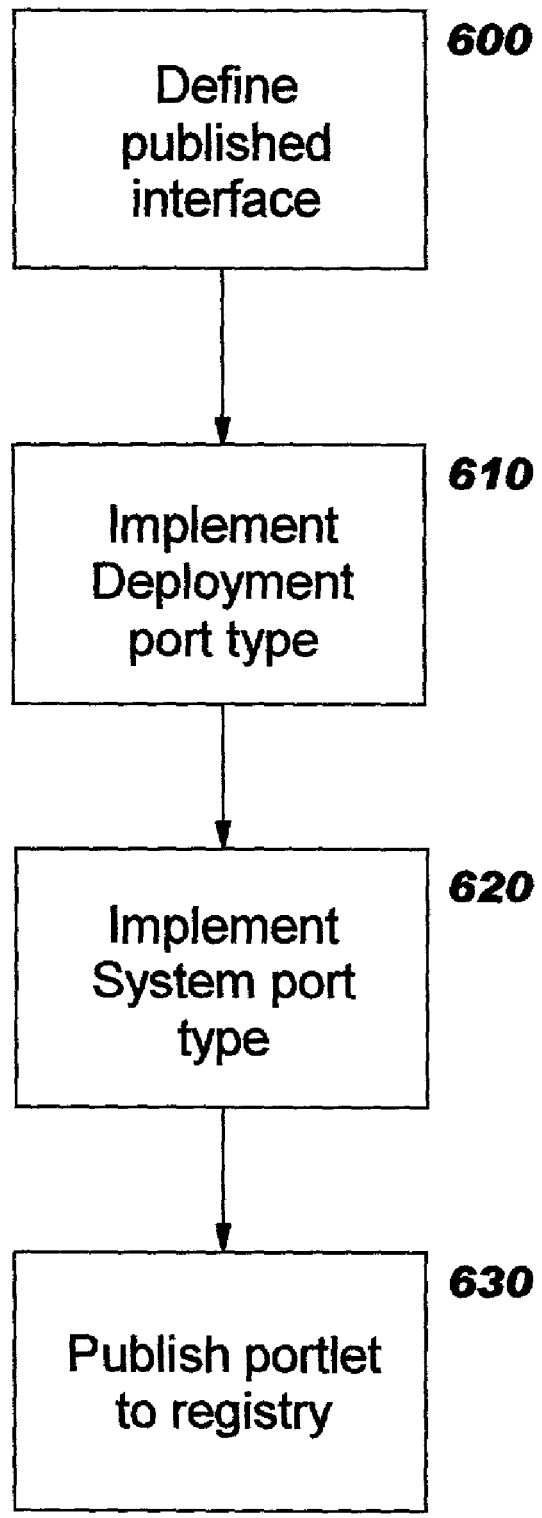
FIGS. 6, 7, 9, 12, 13, and 17 provide flowcharts depicting logic which may be used to implement preferred embodiments of the present invention.

Turning now to FIG. 6, logic is depicted which may be used for creating a portlet proxy for use in a composition tool such as that represented by the sample user interface of FIG. 5. Note that while the description of FIG. 6 is presented herein in terms of preparing a WSDL document describing the portlet's operations, this logic also outlines what is required for a developer creating source code for a software resource. For example, if the software resource will report information through its system interface for quality of service or billing purposes, the developer must provide code to gather the appropriate data and return this data when requested; the method or methods which perform this function may then be identified as part of the system port type of the portlet proxy for the software resource. (See interface 320 of FIG. 3, for example, illustrating that the system interface of portlet proxy 340 exposes the management operations of software resource 350.) This process comprises first determining the operations that will be exposed as the portlet proxy's published functional interface (Block 600). For example, suppose a programmatic portlet such as the portlet represented by icon 520a in FIG. 5 provides order filfillment services. The public interface of this portlet might include a method named "receivePurchaseOrder" (see element 530), which can be used to invoke operations of the underlying software resource. Preferably, a human determines which methods of a software resource should be publicly exposed; alternatively, programmatic operations could be used to select the methods which comprise the public interface. (For example, programmatic operations might be designed to select all public methods for exposing, or perhaps to select only the "getter" public methods.)

Once the public interface is identified, WSDL markup language syntax is programmatically created to specify this information. This comprises generating <message> and <operation> elements, similar to those illustrated in FIGS. 4A and 4B. The composer may be asked to supply information for use in this process, such as the port type name, the location of the name space information, and so forth. Or, this information or parts thereof may be programmatically generated and/or retrieved from a configuration file.

Techniques for programmatic generation of markup language syntax (using input supplied by a human, as well as programmatically-derived information) are known in the art, and a detailed description thereof is not deemed necessary for an understanding of the present invention. IBM's WSTK is an example of a commercially-available product which may be used to programmatically generate WSDL for an existing software resource. See "The Web services (r)evolution: Part 4, Web Services Description Language (WSDL) ", G. Glass (Feb. 2001), published by IBM on the Internet, which presents an example of programmatically generating a WSDL document for a simple weather service which has ("getTemp" and "setTemp" operations. FIG. 4 of this document illustrates asking a composer which methods of a class should be used in creating a public interface. It should be noted that references herein to using a WSDL syntax generator are merely for purposes of illustration; alternatively, a developer might manually create WSDL documents or another type of markup language syntax tool might be used for this purpose.

In addition to specifying the public interface, the portlet's deployment port type information must be created (Block 610). An example of the deployment port type is illustrated in FIG. 4A. If the port type information is programmatically generated, for example using WSTK, this process comprises parsing the software resource's class definition to locate its methods providing the operations of the predefined deployment port type and to identify the parameters and parameter types of each method, and then generating <message> and <operation> elements, as well as <part> elements and <type> definitions as necessary. The composer may be asked to provide input during this process; as needed, such as populating the parameters for the messages of the operations. (For example, to populate the "displayIcon16×16Output" parameter of the "getDisplayIcon16×16Output" message, the composer might specify the Uniform Resource Locator, or "URL", of a particular image file.) The portlet's system port type information is also created (Block 620), in a similar maimer, resulting in a WSDL document such as that shown in FIG. 4B. (In preferred embodiments, the deployment and system interface definitions are placed in separate WSDL documents as shown in the examples of FIGS. 4A and 4B because they describe different behavior.)

Finally, the portlet proxy for the web service is published to a registry (Block 630), after which the portlet proxy is available for use in composing new web services and its services are available for invocation (e.g. using a conventional UDDI find and bind). In preferred embodiments, documents known in the art as "tModels" are used for publishing a portlet proxy's web services information to a registry. (A "tModel", according to the UDDI specification, is metadata which describes the specifications and the versions of specifications that were used to design published services. "tModel" is a generic term for a service "blueprint", defining the conventions to which the registered service conforms. For example, if a registered service includes an "HTTP 1.1 tModel", then this service is known to adhere to certain requirements and conventions associated with that tModel—and, by implication, adheres to particular requirements in its use of HTTP.) Note that a WSDL port type definition can be a tModel; it can also be a partial tModel, which is a tModel in a tModel set. Thus, a single tModel may be used to register both the deployment and system interfaces. (Refer to the UDDI specification for more information on tModels and tModel sets.)

Figure 7:
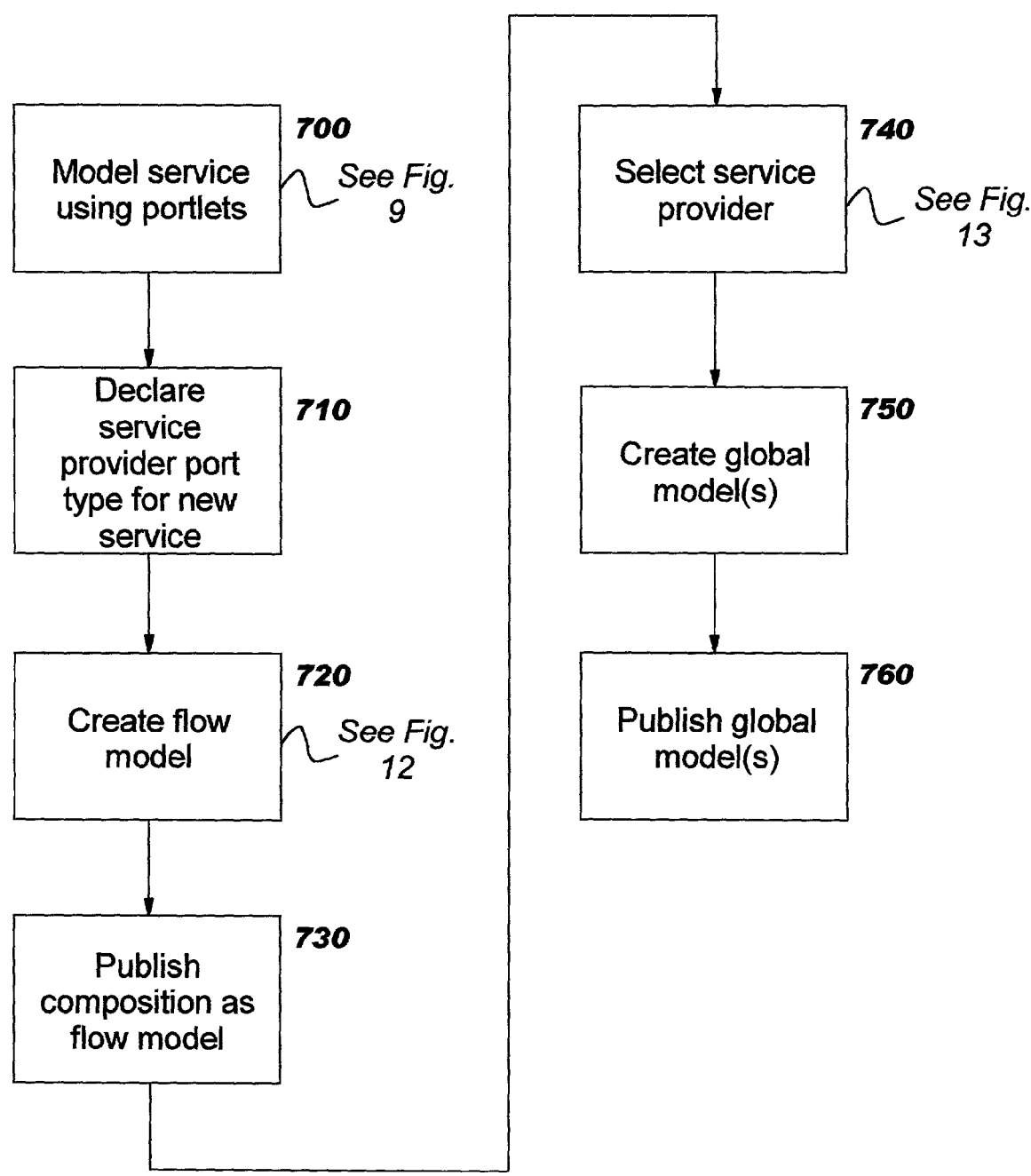

Referring now to FIG. 7, logic is shown which may be used to implement a service modeling and deployment process via a web service composition tool. Block 700 indicates that the new web service is modeled using portlets as proxies or templates for the service being aggregated. That is, a portlet may serve as an intermediary for a web service or for a local resource, defining an interface to the operations provided by one or more back-end software resources. However, the actual software resource(s) providing that service on the back end might not be selected and bound until run-time. The service composer is also able to reuse the composed templates and dynamically plug in different service providers for a static (development-time) binding.

Figure 9:
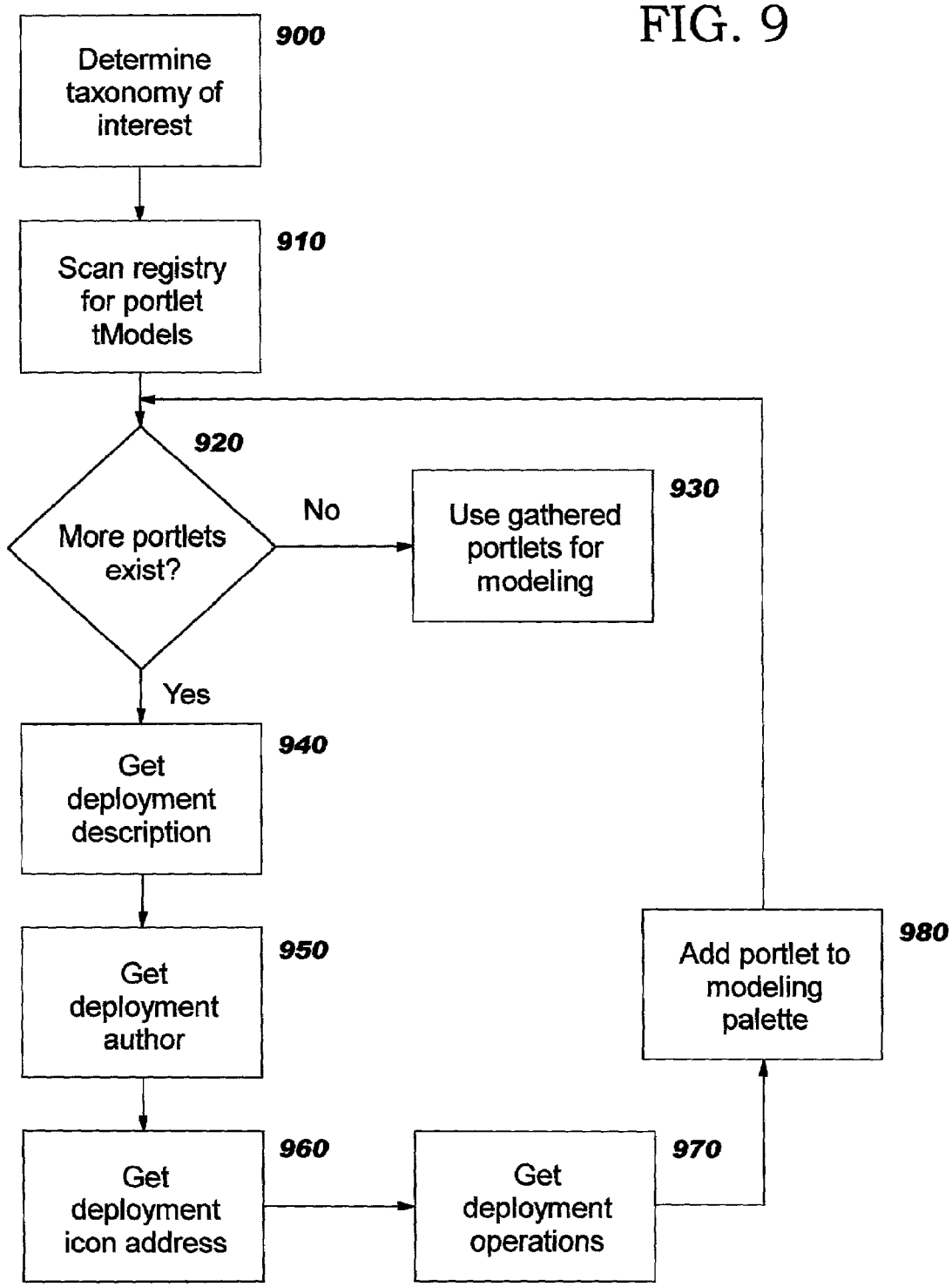

The web service composition tool preferably provides a portlet palette for use in this modeling operation, where registered portlets for a particular taxonomy or category are presented on the palette. The service composer then creates a new web service using the composition tool, for example by right-clicking on a web service icon to display its available methods and then using drag and drop operations to position selected method invocations as operations for carrying out a service. FIG. 9, discussed below, illustrates logic with which information may be gathered for use by the web service composition tool, including locating the appropriate web services to use when constructing the palette.

In preferred embodiments, a directed graph is used to model the operations involved in executing the new web service. Selected portlet operations represent the nodes of the graph, and the graph edges which link the nodes represent potential transitions from one service operation or process to another. These service links can be qualified with one or more transition conditions, and also with data mapping information if applicable. The conditions specify under what conditions the next linked service should be invoked. Often, these conditions will be determined using the results of a previous service invocation. Data mapping refers to the ability to link operations between portlet port types and transfer data from one operation to another. For example, the data mapping information may indicate that the output parameters of one service are mapped to the input parameters of another service.

Preferred embodiments of the present invention leverage the Web Services Flow Language ("WSFL") for directed graphs. In particular, WSFL's persistent storage techniques and run-time evaluation techniques using directed graphs are added to a web services stack to operate upon the graphs created by a service composer. For a detailed discussion of WSFL, refer to the WSFL specification, which is entitled "Web Services Flow Language (WSFL 1.0)", Prof. Dr. F. Leymann (May 2001), available on the Internet from IBM, which is hereby incorporated herein by reference as if set forth fully. (Note that the WSFL specification discusses use of directed graphs for modeling web services, but does not teach directed graphs in combination with services which are provided by programmatic portlet proxies. The WSFL specification defines a "plug link" mechanism, discussed in more detail below with reference to Block 1380 of FIG. 13, which can be used in a proxy model to map interfaces in a simple manner as described herein. This plug link mechanism is used by preferred embodiments of the present invention as the persistent definition of integrating portlet proxies to implement web services.)

A web services stack 800 used in preferred embodiments is illustrated in FIG. 8. Service flow support 810 is preferably provided by WSFL, as stated earlier. Service discovery 820 and service publication 830 are preferably provided using UDDI. A WSDL layer 840 supports service description documents. SOAP may be used to provide XML-based messaging 850. Protocols such as HTTP, File Transfer Protocol ("FTP"), e-mail, message queuing ("MQ"), and so forth may be used for network support 860. As discussed herein, WSDL is used to define web service port types and to define how to invoke operations of these port types, and WSFL is used to aggregate the web services (and therefore to aggregate their interfaces). At run-time, services are found within a registry using the UDDI service discovery process, and bound to using information from their WSDL definitions. The WSFL run-time then uses these (port type) definitions to aggregate the services. (Because the signatures of the operations will typically not match one-to-one, the WSFL plug link mechanism may be used to map between the operation interfaces.)

Referring again to the example composition tool user interface in FIG. 5, the composer has selected to begin the new service with a "receive purchase order" operation 530. For purposes of illustration, suppose this operation evaluates the items on an incoming purchase order to determine whether they are in stock or not. Thus, a transition condition 535 indicates that if an item is out of stock, the next service to be executed is "place order with supplier" 540, whereas if an item is in stock, transition condition 545 applies and the next service to be executed for this item is "add item to invoice" 550. Upon occurrence of some event, such as receiving a shipment of new items or perhaps receiving a notification that the item had to be ordered from the supplier's supplier, transition condition 555 applies and a service "response from supplier" 560 is to be executed. Presumably, this service evaluates the supplier's response, and if a requested item was determined to be available, transition condition 565 applies and the item will be added to an invoice by service 550, whereas if a requested item is not available then transition condition 575 applies and the next service to be executed is "add item to backorder" 580. As will be obvious, the nodes and conditions illustrated in FIG. 5 are merely for purposes of illustration. (Data mapping information has been omitted from the example.)

Figure 10:
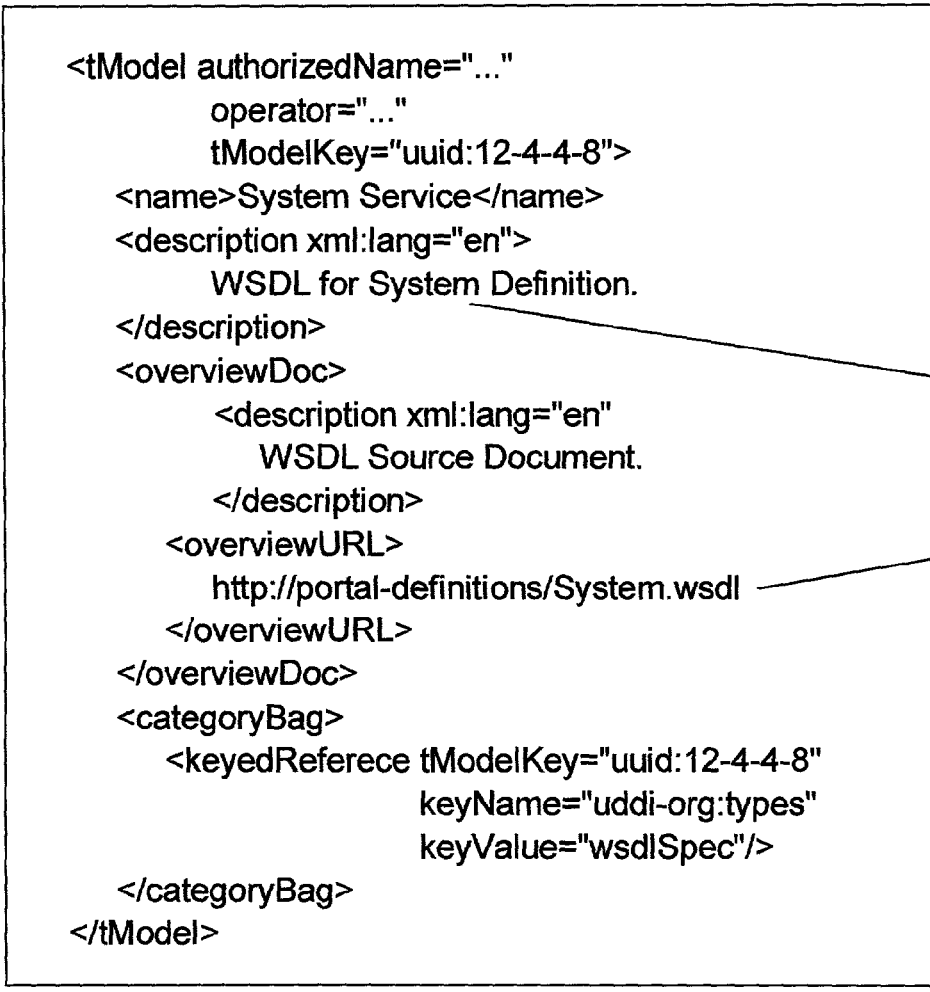
FIG. 10 provides a sample "tModel" which may be used to publish information to a registry.

Turning now to FIG. 9, the process of obtaining information to present to the service composer on the user interface of a composition tool during execution of Block 700 of FIG. 7 preferably begins at Block 900 by determining the taxonomy of interest. One way in which this may be performed is to query the composer. As shown by the example in FIG. 5, the composer may have requested portlet proxies pertaining to item ordering services, and therefore palette 510 includes icons 520a, 520b representing an order fulfillment service and an order payment service. Once the taxonomy is known, the registry is programmatically scanned (Block 910) for portlets whose tModels indicate support for that taxonomy. The scan also checks for tModels representing support for the deployment interface disclosed herein, and optionally the system interface disclosed herein. See FIG. 10 for an example of a tModel that may be used to indicate support for the system service provider type of the present invention. (Optionally, a single tModel may be used to represent both the deployment and system service provider types. Or, a tModel similar to the one shown in FIG. 10 may be separately created for the deployment service provider type.) Note that the WSDL document in FIG. 4B defines an interface template for portlet proxies conforming to the sample tModel in FIG. 10. This correspondence is shown, for example, in the service provider type named in the descriptive information at 1010, and in the file name wherein the service provider type forms part of the URL at 1020. The <overviewURL> element of a tModel functions as a type of import statement to reference a WSDL service specification, as is known in the art. This tModel, along with its associated key, is published as a technical blueprint for a portlet proxy registered in a UDDI registry.

Block 920 performs a test to see if any more portlets meeting the current criteria are available in the registry. If not, then processing continues at Block 930 where the dynamically-gathered information is used in the modeling operation to assemble aggregated services as portlet proxies. Discussion of the modeling operation continues below with reference to Block 710 of FIG. 7.

When the test in Block 920 has a positive result, then the processing of Blocks 940 through 980 is performed to obtain information about the registered portlet proxy which has been located. Block 940 obtains the portlet proxy's deployment description, which is preferably implemented to provide a description of the web service, and Block 950 obtains its deployment author information. Use of this information was previously discussed with reference to FIG. 5. For example, it may be used if the composer requests to see the properties of a web service presented on the user interface of the composition tool.

Block 960 obtains information about the icon to be displayed for this service on the user interface of the composition tool. Preferably, this information comprises an address such as a URL specifying where an icon image is stored. Block 970 obtains the deployment operations for this portlet, in effect determining what the portlet can do.

Preferably, obtaining the deployment information for the portlet proxy in Blocks 940 through 970 comprises executing well-known methods of the deployment interface by issuing the corresponding message from the service's deployment port type. For example, using the deployment port type defined in FIG. 4A, the message "getDisplayIcon16x16Input" may be invoked to obtain the portlet's 16 by 16 icon, and if the portlet has a "getDisplayIcon32x32Input" message, this message can be invoked to obtain the portlet's 32 by 32 icon. (Blocks 940 through 970 should be considered as representative of the information that may be beneficially retrieved for a portlet proxy; additional or different information may be deemed useful in a particular implementation of the present invention.)

After obtaining the pertinent deployment information about the portlet, a representation of the portlet is added to the modeling palette (Block 980), and control returns to Block 920 to determine if there are more portlets of interest in the registry. The processing of Block 920 has been described above.

Returning now to the discussion of FIG. 7, once the composer completes the model of service interaction as a directed graph, at Block 710 the composer declares a service provider port type for the newly-aggrregated service. In order to define this public interface, the composer may select operations to be exposed, or exported, within port types of the service of the composition, thereby identifying the public port type. The composer may select as many operations for exporting as necessary, and may also define new operations if desired. (For example, the composer night decide to define a new name for an operation, and provide a one-to-one mapping for that new name to the old name.) These exposed operations specify the means for invoking the new service. For example, with reference to the sample directed graph in FIG. 5, the composer would specify (at least) the operation "receivePurchaseOrder" corresponding to node 530 as a public interface. The composer may also provide a data mapping between an exposed operation and an internal service port type operation. For the sample directed graph in FIG. 5, having a public interface of "receivePurchaseOrder", the composer might specify (for example) a data mapping that converts data to a particular format required by this operation, such that an input parameter named "inputPurchaseOrder" adhering to a predefined type "purchaseOrder" would be available to the service upon invocation. Providing the data mapping may comprise identifying a canned transformation component, such as an integer-to-float transform; identifying a stylesheet which contains an appropriate transformation, such as an XSLT (Extensible Stylesheet Language Transformations) stylesheet; identifying customized transformation logic, which may for example convert one complex data type to another; and so forth. (Refer to the discussion of FIGS. 11A-11C, below, for more information about declaring the interface to a web service intermediary and potential web service software resources, and about providing transformation information.) The process of declaring the exposed port types (i.e. operations) results in the new service provider type for the aggregated composition. Thus, this new composition is itself a portlet proxy, or web service intermediary, that can be used as a building block in farther compositions.

The composer also provides a mapping for the deployment port type and for the system port type, if applicable, such that the resulting web service will be able to be used within a web service composition tool and will be able to be programmatically managed by the portal platform as disclosed herein. This is preferably accomplished by prompting the composer (using a menu-driven approach, for example) to identify operations and data mappings that will then be represented in WSFL markup language <export> and <dataLink> elements, which enable providing a new interface and doing internal mapping for that interface. (Refer to section 4.5.3, "Data Links and Data Mapping", and section 4.6.4, "Exporting Operations", of the WSFL specification for more information on the syntax and semantics of the <export> and <dataLink> elements.)

In some cases, it may be desirable to generate the deployment and/or system port types (and similarly, the public interface of the portlet proxy) without reference to a particular target software resource. For example, suppose that run-time quality of service is an important factor in choosing a service provider for some service such as credit card processing. To provide a more generic interface which will programmatically adapt to one of several target service providers after a run-time service selection, according to the present invention, the composer may be asked to provide input for use in creating the WSDL document (see the description of Blocks 600 through 620); this process may be assisted by parsing class definitions and having the composer point to the fight operations. The examples in FIGS. 11A and 11B show signatures that might exist for two candidate software resources for a credit card processing operation. The example in FIG. 11C shows a sample signature that might be designed as a superset which includes all parameters for both possible candidates. The manner in which a run-time mapping of input parameter values to the parameters required by the selected resource occurs is described below.

In preferred embodiments, a WSFL "flow model" is used to persistently store the new service composition. Thus, the flow model of the newly-composed web service is created (Block 720). This flow model is transmitted as a document accompanying the UDDI publish message for the new web service (Block 730), after which the new web service becomes automatically available to service requesters (such as other business units of an organization or its business partners). A WSFL flow model is a markup language specification of the execution sequence of the functionality provided by the web service which has been composed as a directed graph (where the directed graph was constructed during execution of Block 700). See section 8.4, "The Flow Models for Airline and Agent", in the WSFL specification for examples of flow models and their syntax. The WSFL specification provides a thorough description of the syntax requirements for flow models, and that discussion is not repeated herein.

The flow model used with the present invention may be programmatically constructed using the logic shown in FIG. 12, as will now be described.

Figure 12:
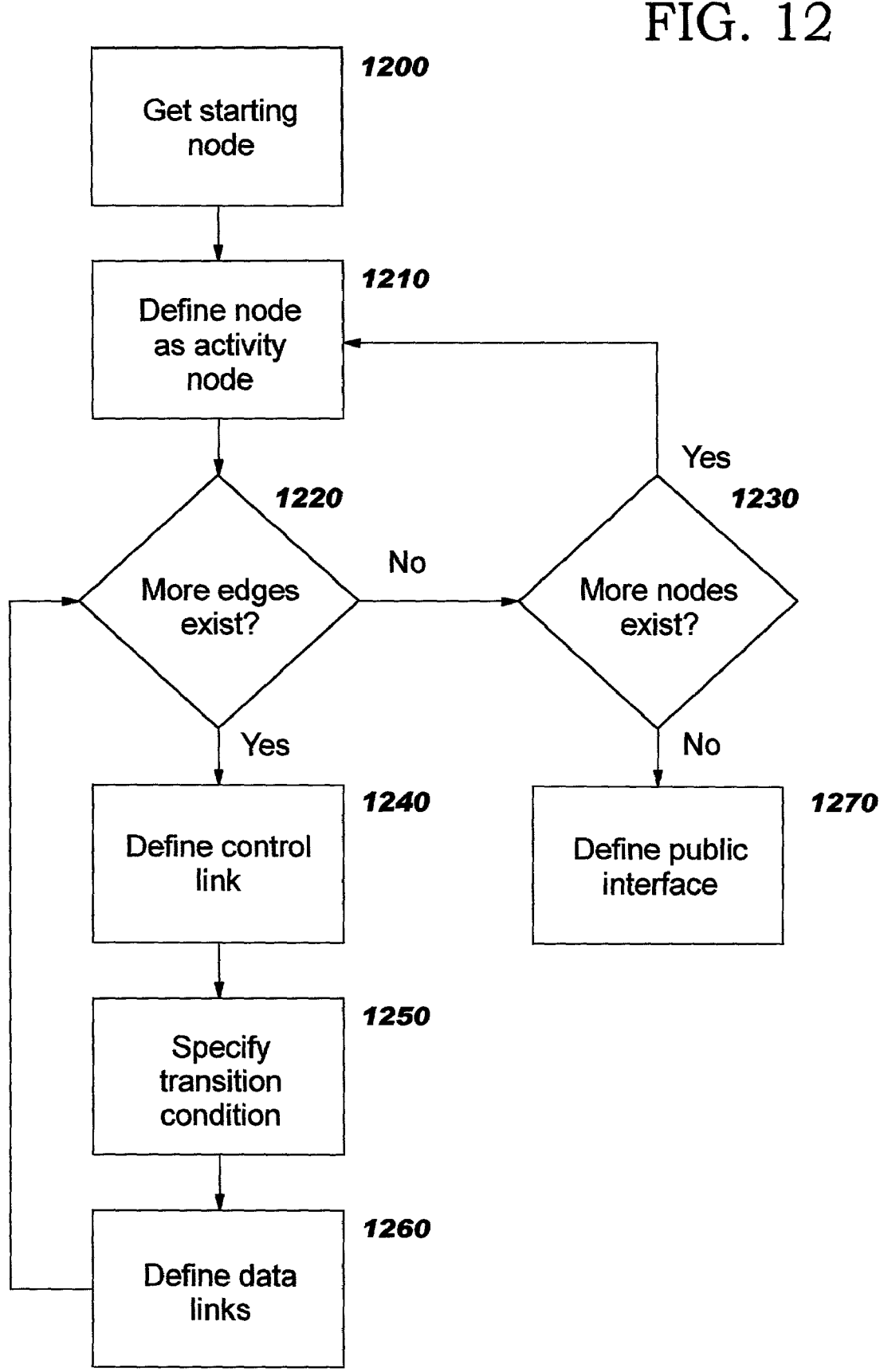

The flow model construction process, wherein the directed graph created by the composer is converted to a WSFL flow model, is shown in FIG. 12 and begins at Block 1200 by locating the starting node of the graph. A WSFL activity element will be defined for each graph node, or operation, within the composition, as indicated by Block 1210, beginning from the located starting node. (Refer to the WSFL specification for a detailed description of the syntax of the elements created during the processing of FIG. 12.) Block 1220 then checks to see if this graph node has any edges which have not yet been processed. If this test has a positive result, then processing continues at Block 1240 which defines a control link for that edge. Control links will provide the flow between operations, using the WSFL runtime, and thus represent the edges of the composition graph. These links are then weighted with the transition conditions that specify the conditions under which that service interaction will execute (Block 1250). Data links are added (Block 1260) to the control links, as appropriate, to define the mapping of data between activity operations. Control then returns to Block 1220 to see if this node has any more edges to be processed.

When the node's edges have all been processed, the test in Block 1220 has a negative result and control transfers to Block 1230, which checks to see if any more nodes exist in the graph which have not yet been processed. If this test has a positive result, control returns to Block 1210 to begin processing the next graph node. Otherwise, the public interface to this service is defined (Block 1270) as a collection of the declared operations and port types specified as part of the service provider type. Creation of the flow model document for this service is then complete.

Note that while the WSFL run-time provides the means for programmatically constructing a flow model diagram from a directed graph which represents a web service, the present invention extends the existing support by coupling this model with traditional portlet aggregation (that is, aggregating predefined port types, as extended herein to programmatic portlets) and injecting intelligent interface aggregation through external services. (This latter topic is described in more detail below with reference to "convert-lets".)

Returning to the discussion of FIG. 7, after publishing the flow model to the registry, at Block 740 the service selection process is performed for a newly-aggregated service. Service selection is the act of binding a portlet (that is, the service provider type defined in the portlet proxy's service definition) to an actual service provider (or providers) which provides software resources to fulfill that service process. The service selection operation may be performed according to the logic shown in FIG. 13, as will now be described.

Preferably, the composer uses a toolkit such as WSTK to access a UDDI registry containing information about services that are available for aggregation. In Block 1300, an identification of the public or private registry to be queried is obtained. The composer may be prompted to enter this information; alternatively, it may be retrieved from a stored location such as a configuration file. The identification of one or more service taxonomies of interest is obtained (Block 1310), using similar techniques. The identified registry is then queried (Block 1320) for entries matching the selected taxonomy information. In Block 1330, the tModels of the located entries are checked to select only the registered services which are enabled for and which conform to the deployment (and, optionally, the system) port type(s) of the present invention.

Optionally, message mapping is performed in Block 1340 to map messages and their associated data. The mapping provides one portion of the plug link information; the other portion is the locator information discussed below (see Block 1350). Message mapping is typically required, and is optional when there is a dual one-to-one correspondence between operations. Mapping may be defined using several techniques, of the type which has been described earlier (such as using XSLT stylesheets, referencing program logic, and so forth). Or, "convert-lets" may be used for performing the mapping; convert-lets are described below with reference to FIG. 15C.

A service locator is defined (Block 1350), providing a mechanism to control how the web service intermediary will bind to a web service implementation. This may comprise creating a WSFL locator binding, using a <locator> element to identify a WSDL or WSFL service definition; or, it may comprise creating a UDDI-type binding on a <locator> element.

A particular service provider can be selected by the composer as a static binding, for example based upon information obtained from UDDI yellow pages descriptions, for a static development-time binding of the web service intermediary to the service provider. Or, service provider selection can be specified as using a dynamic run-time binding, by using a dynamic locator. Therefore, Block 1360 checks to see if the binding will be static or dynamic. If it is to be dynamic, the selection process will be deferred until run-time, and the composer preferably indicates one or more selection criteria (Block 1370) as UDDI service qualifiers to be used in the dynamic binding process. Examples of the semantics of such criteria include: select a service provider using the first hit returned from searching the registry; select a provider randomly; select a service provider that matches specific service qualifiers; etc. An example was previously discussed in terms of matching quality of service criteria for selecting a credit card processing service provider. The <locator> element for a dynamic binding preferably contains query syntax for use with the UDDI find operation, specified as the value of the "selectionPolicy" attribute. (Refer to section 4.4.3, "Service Locators", of the WSFL specification for more information on defining service locator elements.)

At Block 1380, a plug link is generated for this web service. A WSFL "plug link" is a markup language specification of mappings between the signature of the calling and called service provider operations (that is, between the portlet proxy's standard interface and the interface of the web service implementation). Section 4.7, "Plug Links", of the WSFL specification describes plug links in more detail. FIG. 14 illustrates a sample plug link 1400. In this example, the plug link specifies that if the "sendForm" message is received to invoke the "send" operation, it is to be mapped onto the "receiveForm" message to invoke the "receive" operation.

While plug links are known in the art, their use with portlet proxies is a novel aspect of the present invention.

Note, however, that the data mapping support for plug links defined in the WSFL specification provides a relatively restricted form of data mapping. A <map> element is provided, as shown at 1410, for a <dataLink> element of a flow model, which qualifies how to map one operation's message to another. The plug link defined by WSFL is limited to specifying a source message, a single target message, a source message attribute, and a single target message attribute. Thus, if one web service returned the markup document 1500 shown in FIG. 15A, and needed to pass this information to an aggregated web service whose method signature was "submitName (Name: string)", the existing WSFL syntax allows specification of a mapping that would (for example) pass the value of the <firstName> element from document 1500 as the input parameter to the submit-Name method. An example <map> element 1520 which may be used within a plug link document to provide this mapping is shown in FIG. 15B. This is somewhat limiting in that operation attributes might not always map one-to-one, and transformations more complex than identifying an attribute for direct transfer might be necessary. For example, with reference to document 1500, it might be desirable to concatenate the values of the <firstName> and <lastName> elements for transfer to the next operation.

The present invention, on the other hand, leverages the portal platform as an intelligent aggregator for programatic portlets by extending the <map> element to include a specification of a <converter> attribute, as illustrated in FIG. 15C. The <converter> attribute is referenced in the WSFL specification, section 4.5.3, "Data Links and Data Mapping". However, no information is provided therein as to how this attribute is used or implemented. Instead, the WSFL specification merely mentions that a converter attribute can specify a user-provided function for data mapping and conversion, and then goes on to state that the attribute is not yet supported.) As shown therein, the attribute value is specified as a Uniform Resource Name ("URN") identifying the portal platform. Since the portlet proxies of the present invention represent a standard interface for a web service aggregated in the portal platform (i.e. a web service intermediary), the portal platform can be used as a repository of portlet-to-portlet operation transformations. These transformations are referred to herein as "convert-lets", and may be referenced from the URN of a <converter> element. At run-time, the portal platform will automatically select the appropriate convert-let from a portal transformation registry, such as the simplified transformation registry 1600 depicted in FIG. 16, and apply the transformation between the web service operations. The transformations specified in this registry (see element 1610) may be arbitrarily complex, and may be implemented in a variety of ways. For example, an XSLT stylesheet might be specified, or a piece of code implemented as a JavaBean or perhaps even another portlet proxy (encapsulating a web service) could be specified for performing a transformation. (As will be obvious to one of skill in the art, the sample registry 1600 is merely one example of an approach that may be used for identifying the convert-lets used for converting data. For example, additional information might be contained in the registry, and formats other than the tabular format depicted in FIG. 16 might be used. In addition, the entries in this registry are not limited to one-to-one mappings: alternatively, a collection or set of "From" portlets and/or "To" portlets might be specified. Furthermore, rules or other criteria for identifying a "From" or "To" portlet might be specified, rather than explicitly identifying the portlets by name.)

Optionally, if a transformation between two portlet proxy interfaces does not already exist when those portlet proxies are used in modeling a new web service, as may be determined by consulting a portal platform's transformation registry, the service composer may be prompted to provide (or identify) an appropriate convert-let.

Figure 13:
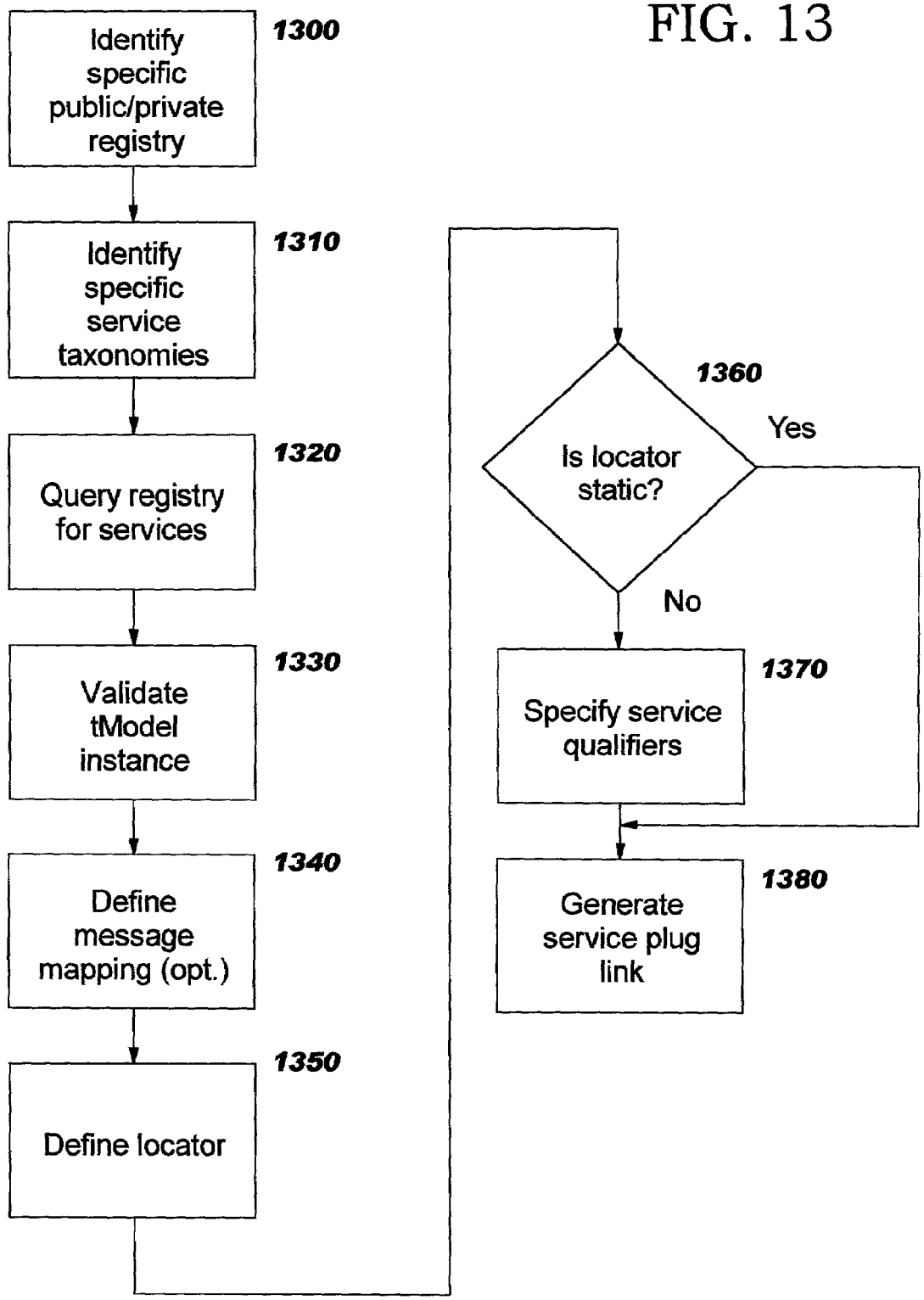

Note that while the processing of FIG. 13 has been described as an in-line part of creating a new web service (by virtue of the logic of FIG. 7), this processing may also be performed for web services that have already been created and stored in the registry, to enable those services to be used according to the present invention by creating a web service intermediary for the existing web service. In this case, the tModel validation of Block 1330 may be bypassed, as the deployment and system tModels will typically have not been created for the registered web service. The deployment port type is provided by mapping the appropriate operations of the web service, as described above with reference to FIG. 12. (The composer may specify new operations if the existing web service does not provide the necessary operations. For example, if the web service does not include an operation to retrieve icons which will represent the service on the palette of the composition tool, the composer may add these operations.) If the underlying software resources provide auditing information, the composer may specify a mapping between these operations and the system port type. A WSFL plug link is then generated to represent this mapping and data transfer, as discussed earlier.

Returning again to FIG. 7, once the service provider selection process of Block 740 is complete, a WSFL "global model" for the service bindings is created (Block 750). A WSFL global model is a markup language specification of links between endpoints of web service interfaces, with each link corresponding to one web service's interaction with another web service's interface. WSFL plug links are used in the global model to describe the interaction between the portlet proxy and the selected service provider (or, alternatively, a candidate service provider). Section 4.8, "Global Model", of the WSFL specification describes global models in more detail.

The global model (or models, if there is more than one candidate service provider) are published to the registry (Block 760), in addition to publishing the flow model at Block 720, in order to specify binding information for use with the newly-created service composition represented by the flow model. Note that reuse of the flow model for more than one global model allows other service providers to be plug-linked into the service interaction flow through the portlet proxy by substituting a different global model. Additionally, publishing the composition's flow model in the registry allows for the flow model to be retrieved and decomposed so that elements can be added, removed, or changed (e.g. in a web service composition tool such as that illustrated by FIG. 5) as necessary to create a new web service. (It may be desirable in some cases to prevent this type of decomposition and modification, for example when privacy or security is a concern. For such cases, a capability for privately publishing the flow model may be provided.)

Figure 17:
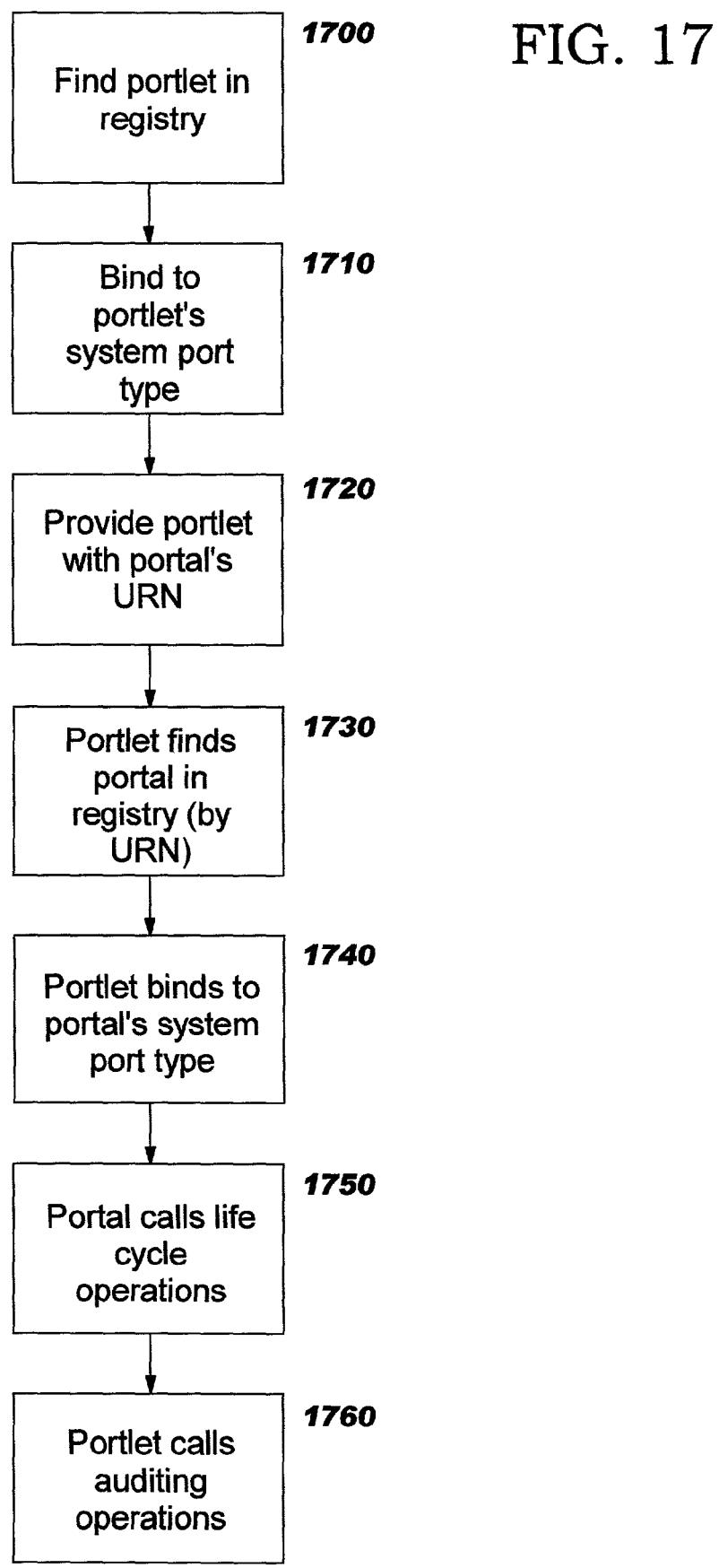

Turning now to FIG. 17, the automated management of web services which is facilitated by the system port type of the present invention will be described in more detail. The system port type is used at run-time, and enables communication of life cycle events which are necessary for a portlet proxy to operate within a portal platform. These life cycle events include operations such as "spawn" for creating a new instance and "terminate" for terminating an instance. Additional life cycle events include "call", for executing an instance; "enquire", for querying the status of an instance; "suspend", for suspending an instance; and "resume", for resuming an instance. The WSFL specification describes these six life cycle events in more detail, and existing WSFL support is preferably used for implementing these six life cycle events. (The portal platform calls methods of visual portlets of the prior art for carrying out such events, and the portal platform preferably calls a programmatic portlet according to the present invention in the same manner.) The system port type also allows communication back to the portal platform for performing functions such as reporting of events for a log, reporting information for use in billing for services, reporting of quality of service data, reporting various types of run-time execution errors or other operational events, etc. These reporting-type functions may be referred to as an "auditing" interface of a portlet proxy. In order for this auditing information to be sent to the portal platform, the portlet proxy must have a way to initiate communications with the platform. This type of 2-way communication between a portal platform and a portlet is not available in the prior art. According to the present invention, this communication is made possible by registering the portal platform itself as a web service which is then accessible from a registry. (This registration of the portal platform may occur at any time before the platform begins interacting with programmatic portlets as disclosed herein, and thus this registration has been omitted from FIG. 17.)

When the portal platform deploys a portlet proxy which includes the system port type, the logic shown in FIG. 17 may be used to enable communication of data using the portlet proxy's auditing interface. Beginning in Block 1700, the portal platform searches the registry for the portlet proxy it wants to communicate with. Preferably, this search looks for a web service having a tModel which specifies the system interface (and optionally the deployment interface) disclosed herein. Upon finding an appropriate web service, the portal platform binds to the system port type of that web service (Block 1710). The portal platform can now initiate communications with the portlet proxy. At Block 1720, the (previously-registered) portal platform programmatically provides its URN to the portlet proxy (for example, by invoking a "setURN" method of the portlet proxy). The portlet proxy then uses this URN to look up the portal platform's interface (from the portal platform's information in the registry), as shown in Block 1730. The portlet proxy then uses the portal platform's registered information to bind to its system port type (Block 1740). At this point, the 2-way communication is established and the portlet proxy can now initiate communications with the portal platform (by programmatically invoking the appropriate operations of the platform). Block 1750 indicates that the portal platform may call life cycle operations of the portlet proxy, such as the "enquire" operation, and Block 1760 indicates that the portlet proxy may also call auditing operations of the portal platform, such as a "logEvent" or "reportUsage" operation which was previously described with reference to FIG. 4B.

Figure 18:
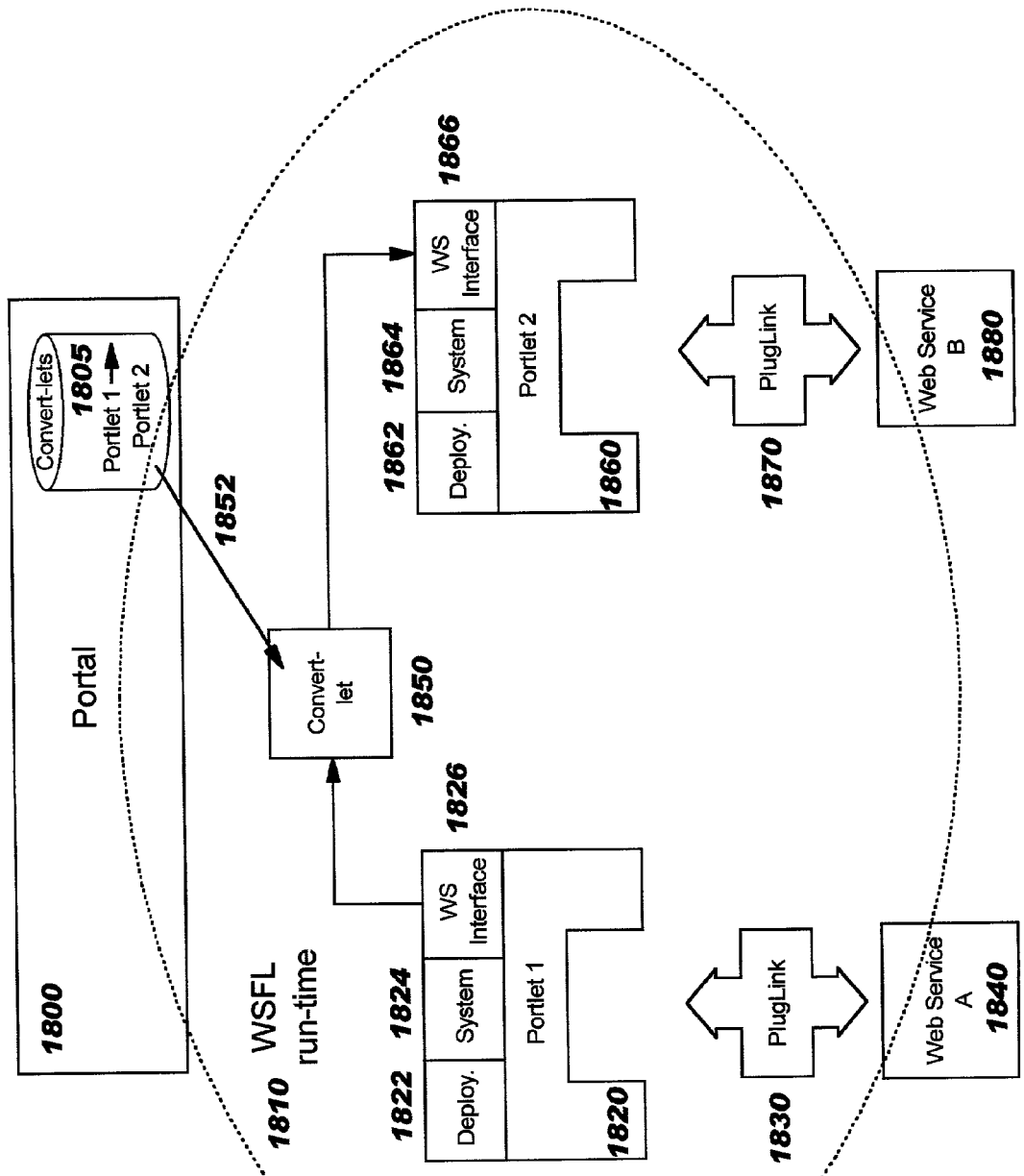
FIG. 18 provides an overview of components used in describing the present invention.

FIG. 18 illustrates an overview of the components which have been described herein. A portal platform 1800 includes (or accesses) a transformation registry 1805, which stores convert-lets (i.e. mappings between programmatic portlets). A first programmatic portlet 1820, which includes a deployment interface 1822, system interface 1824, and web service functional interface 1826, needs to supply information to a second programmatic portlet 1860 which includes similar interfaces 1862, 1864, 1866. Presumably, portlet 1820 obtains this data from execution of a first web service 1840, where plug link 1830 provides for programmatic interactions between portlet 1820 and web service 1840, and portlet 1860 will pass this data to a second web service 1880, using plug link 1870 to programmatically interact with web service 1880. A transformation is required in this example before the data can be passed between the programmatic portlets. This transformation will be performed by convert-let 1850, which has been programmatically retrieved from the transformation registry 1805, as shown at 1852. The WSFL run-time 1810 coordinates and manages these interactions through execution of the flow models and global models which have been created to represent the programmatic portlets 1820, 1860 and their interfaces to the web service implementations 1840, 1880, rendering the WSFL markup by flowing the defined work flow and calling the appropriate activities through the defined mappings (or the dynamically-determined mappings specified by convert-lets).

As has been demonstrated, the present invention provides advantageous techniques for aggregating, deploying, and managing web services. A dual aggregation model was disclosed, whereby a WSFL run-time provided for modeling aggregation of services was combined with traditional portal aggregation services available through a portal platform (and extended as disclosed herein to address programmatic portlets), thereby providing the "glue" for using programmatic portlets in a portal platform to enable aggregating programmatic portlets in a portal in real-time. The disclosed techniques enable this to occur programmatically, without requiring manual intervention. Programmatic portlets are modeled as web service intermediaries to either local software resources or remote resources, and/or other portlets. Web service models are expressed and published as WSFL flow models, and service providers are linked using WSFL global model expressions. Open standards are leveraged for business process modeling and integration, defining significant advances in the web services field. Note that while particular standards (such as WSFL) have been referenced when describing preferred embodiments, this is for purposes of illustrating the inventive concepts of the present invention. Alternative means for providing the analogous functionality may be used without deviating from the scope of the present invention.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems), and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A method of dynamically integrating software resources in a computing network, comprising steps of:
    selecting a collection comprising a plurality of software resources for integrating as a software service for deployment in a content aggregation framework, wherein at least one operation is invocable from each of the software resources;
    programmatically building a markup language document to specify the operations invocable from the collection of software resources; and
    using the content aggregation framework, at run time, to programmatically and dynamically integrate the collection of software resources into the content aggregation framework to carry out the software service provided by the collection, further comprising the steps of:
        programmatically consulting the programmatically-built markup language document to determine the operations specified therein;
        using the determined operations as a functional interface of a proxying component, wherein the proxying component is accessible from the content aggregation framework; and
        deploying the software service in the content aggregation framework by using the functional interface of the proxying component to surface the software service in the content aggregation framework, wherein the functional interface of the proxying component represents, as operations invocable from the proxying component in the content aggregation framework, the operations specified in the markup language document as being invocable from the collection of software resources.

2. The method according to claim 1, wherein the markup language document is used as a service description document specifying the functional interface for the proxying component; and further comprising the step of:
    registering the service description document in a network-accessible registry from which the service description document is dynamically discoverable, thereby enabling the operations invocable from the collection of software resources to be discoverable, in the programmatically consulting step, at run time from the network-accessible registry.

3. The method according to claim 2, further comprising the steps of:
    defining, as a deployment interface for the proxying component, at least one deployment operation provided by at least one of the software resources in the collection, the deployment interface adapted for representing the collection in a service composition tool with which a user can build new distributed software services; and
    specifying the defined deployment interface in the service description document.

4. The method according to claim 2, further comprising the steps of:
    defining, as a system interface for the proxying component, at least one system management operation provided by at least one of the software resources in the collection, each of the system management operations adapted for managing the providing at least one of the software resources; and
    specifying the defined system interface in the service description document.

5. The method according to claim 2, wherein the network-accessible registry is accessed using standardized messages.

6. The method according to claim 1, wherein the proxying component is a portlet, and wherein the software resources comprise at least one of other portlets and non-portlets.

7. The method according to claim 1, wherein the collection of software resources comprises a web service.

8. The method according to claim 1, wherein the markup language is Web Services Description Language ("WSDL").

9. The method according to claim 1, wherein the collection of software resources comprises a web service and wherein the using step provides dynamic integration of the web service into the content aggregation framework.

10. A system for dynamically integrating software resources in a computing network, comprising:
    a processor; and a memory coupled to the processor;
    a content aggregation framework adapted for supporting one or more plug-in components, each of which contributes content for aggregating in the content aggregation framework;
    a plurality of software resources, each comprising at least one invocable operation;
    a proxying component structured as one of the plug-in components;
    means for selecting a collection comprising a plurality of the software resources for integrating as a software service for deployment in the content aggregation framework;
    means for programmatically building a markup language document to specify the operations invocable from the collection of software resources;
    means for using the markup language document as a service description document specifying a functional interface of the proxying component;
    means for registering the service description document in a network-accessible registry; and
    means for using the content aggregation framework to programmatically and dynamically integrate the collection of software resources into the content aggregation framework at run-time to carry out the software service provided by the collection, further comprising:
        means for dynamically discovering the service description document, from the network-accessible registry, at run-time;
        means for programmatically consulting the dynamically-discovered service description document, by the content aggregation framework, to determine the operations specified therein;
        means for using the determined operations as the functional interface of the proxying component; and
        means for deploying the software service in the content aggregation framework, further comprising:
            means for using the functional interface of the proxying component to surface the software service in the content aggregation framework, wherein the functional interface of the proxying component represents, as operations invocable from the proxying component in the content aggregation framework, the operations specified in the service description document as being invocable from the selected collection of software resources; and means for programmatically binding, by the content aggregation framework, to the functional interface of the proxying component using the functional interface specified in the dynamically-discovered service description document, thereby enabling the operations invocable from the proxying component to be invocable from the content aggregation framework for carrying out the software service.

11. The system according to claim 10, further comprising:
means for defining, as a deployment interface for the proxying component, at least one deployment operation provided by at least one of the software resources in the collection, the deployment interface adapted for representing the collection in a service composition tool with which a user can build new distributed software services; and
means for specifying the defined deployment interface in the service description document.

12. The system according to claim 10, further comprising:
means for defining, as a system interface for the proxying component, at least one system management operation provided by at least one of the software resources in the collection, each of the system management operations adapted for managing the providing at least one of the software resources; and
means for specifying the defined system interface in the service description document.

13. The system according to claim 10, wherein the proxying component is a portlet, and wherein the software resources comprise at least one of other portlets and non-portlets.

14. A method of using a proxying component to integrate software resources in a content aggregation framework, comprising:
defining, as a functional interface to the proxying component in the content aggregation framework, operations invocable from a collection comprising a plurality of software resources as operations invocable from the proxying component, wherein the proxying component is adapted for plugging in to the content aggregation framework and serves, when plugged in to the content aggregation framework, as a proxy for the collection of software resources that are thereby accessible from the content aggregation framework;
specifying the defined functional interface in a service description document;
registering the service description document in a network-accessible registry, thereby enabling the functional interface of the proxying component to be programmatically and dynamically discoverable at run time from the network-accessible registry;
retrieving, by the content aggregation framework, the registered service description document for the proxying component from the network-accessible registry upon discovery thereof;
plugging the proxying component in to the content aggregation framework by dynamically binding, by the content aggregation framework, to the functional interface of the proxying component using the functional interface specified in the retrieved service description document, thereby enabling the operations invocable from the proxying component to be invocable in the content aggregation framework; and
using the functional interface at run time to invoke at least one operation invocable from the proxying component, wherein each of the invocations causes the proxying component to invoke a corresponding one of the operations invocable from the collection of software resources.

15. The method according to claim 14, wherein the proxying component is a portlet.

16. The method according to claim 14, wherein the content aggregation framework is a portal platform.

17. The method according to claim 14, wherein the collection provides a web service.

18. A computer program product for dynamically integrating software resources in a computing network, the computer program product embodied on one or more computer-readable media and comprising:
computer-readable program code for selecting a collection comprising a plurality of software resources for integrating as a software service for deployment in a content aggregation framework, wherein at least one operation is invocable from each of the software resources;
computer-readable program code for programmatically building a markup language document to specify the operations invocable from the collection of software resources; and
computer-readable program code for using the content aggregation framework, at run time, to programmatically and dynamically integrate the collection of software resources into the content aggregation framework to carry out the software service provided by the collection, further comprising:
computer-readable program code for programmatically consulting the programmatically-built markup language document to determine the operations specified therein;
computer-readable program code for using the determined operations as a functional interface of a proxying component, wherein the proxying component is accessible from the content aggregation framework; and
computer-readable program code for deploying the software service in the content aggregation framework by using the functional interface of the proxying component to surface the software service in the content aggregation framework, wherein the functional interface of the proxying component represents, as operations invocable from the proxying component in the content aggregation framework, the operations specified in the markup language document as being invocable from the collection of software resources.

19. The computer program product according to claim 18, wherein the markup language document is used as a service description document specifying the functional interface for the proxying component; and further comprising:
computer-readable program code for registering the service description document in a network-accessible registry from which the service description document is dynamically discoverable, thereby enabling the operations invocable from the collection of software resources to be discoverable, by the computer-readable program code for programmatically consulting, at run time from the network-accessible registry.

* * * * *